(12) United States Patent
Kim et al.

(10) Patent No.: US 10,147,081 B2
(45) Date of Patent: Dec. 4, 2018

(54) METHOD FOR PROVIDING CONTENTS

(75) Inventors: Sung-Woo Kim, Seoul (KR); Gap-Chun Back, Seoul (KR); Kyoung-Yong Min, Namyangju-si (KR); Bong-Goon Kwak, Goyang-si (KR); Hyung-Sik Kim, Anyang-si (KR); Hee-Yun Hong, Seongnam-si (KR)

(73) Assignee: KT CORPORATION, Kyeonggi-do (KR)

( * ) Notice: Subject to any disclaimer, the term of this patent is extended or adjusted under 35 U.S.C. 154(b) by 560 days.

(21) Appl. No.: 11/801,079

(22) Filed: May 8, 2007

(65) Prior Publication Data

US 2007/0276767 A1 Nov. 29, 2007

Related U.S. Application Data

(63) Continuation of application No. PCT/KR2006/001355, filed on Apr. 12, 2006.

(30) Foreign Application Priority Data

Apr. 15, 2005 (KR) .................. 10-2005-0031248
Mar. 29, 2006 (KR) .................. 10-2006-0028513

(51) Int. Cl.
*G08C 13/00* (2006.01)
*G06Q 20/32* (2012.01)
(Continued)

(52) U.S. Cl.
CPC .............. *G06Q 20/32* (2013.01); *G06F 8/61* (2013.01); *G06Q 20/085* (2013.01);
(Continued)

(58) Field of Classification Search
CPC ................................ G06Q 20/32; G06F 8/61
(Continued)

(56) References Cited

U.S. PATENT DOCUMENTS 5,349,678 A 9/1994 Morris et al.
5,410,543 A 4/1995 Seitz et al.
(Continued)

FOREIGN PATENT DOCUMENTS

JP 1998-133881 A 5/1998
JP 1998-240602 9/1998
(Continued)

OTHER PUBLICATIONS

Notice of Allowance relating to U.S. Appl. No. 11/724,698 dated Jun. 21, 2011.
(Continued)

*Primary Examiner* — Hao Fu
*Assistant Examiner* — Martin A Gottschalk
(74) *Attorney, Agent, or Firm* — IP Legal Services, LLC

(57) ABSTRACT

The present invention relates to a method and system of providing content, particularly, a method and system of selling additional extension data with charge without changing already-stored execution file. The present invention relates to a game content server comprising a game content list providing module, a package list generating module, a compiling module, an application transmitting module, a resource transmitting module and a billing module, and after providing the game content comprising a game execution file and an item file, it is possible to add or change extension data (item file) without changing the game execution file additionally. Also, it is possible to charge the addition or change of extension data of the game content.

16 Claims, 17 Drawing Sheets

(51) Int. Cl.
*G06F 8/61* (2018.01)
*G06Q 20/08* (2012.01)
*G06Q 20/12* (2012.01)
*G06Q 20/14* (2012.01)

(52) U.S. Cl.
CPC ......... *G06Q 20/1235* (2013.01); *G06Q 20/14* (2013.01); *G06Q 20/322* (2013.01)

(58) Field of Classification Search
USPC .......... 707/E17.005, E17.119, 1, 3, 10, 100, 707/200; 709/203, 217, 218, 219; 715/234
See application file for complete search history.

(56) References Cited

U.S. PATENT DOCUMENTS

| | | | |
|---|---|---|---|
| 6,072,493 A * | 6/2000 | Driskell et al. | 715/854 |
| 6,360,209 B1 * | 3/2002 | Loeb et al. | 705/34 |
| 6,493,871 B1 | 12/2002 | McGuire et al. | |
| 6,529,586 B1 | 3/2003 | Hori | |
| 6,675,382 B1 | 1/2004 | Foster | |
| 6,839,744 B1 | 1/2005 | Kloba et al. | |
| 6,970,849 B1 * | 11/2005 | DeMello et al. | 705/52 |
| 7,039,177 B1 | 5/2006 | Smith et al. | |
| 7,155,517 B1 | 12/2006 | Koponen et al. | |
| 7,171,477 B2 | 1/2007 | Hori et al. | |
| 7,304,984 B2 * | 12/2007 | Butler et al. | 370/352 |
| 7,363,035 B2 | 4/2008 | Reilly | |
| 7,583,801 B2 | 9/2009 | Terekhova et al. | |
| 7,593,686 B1 | 9/2009 | Knoop | |
| 7,734,579 B2 * | 6/2010 | White et al. | 707/609 |
| 7,739,413 B2 * | 6/2010 | Dewa et al. | 709/250 |
| 7,805,719 B2 | 9/2010 | O'Neill | |
| 8,160,563 B2 * | 4/2012 | Chen et al. | 455/419 |
| 8,776,042 B2 * | 7/2014 | Hughes | 717/170 |
| 2001/0029605 A1 | 10/2001 | Forbes et al. | |
| 2002/0131404 A1 | 9/2002 | Mehta et al. | |
| 2003/0110044 A1 * | 6/2003 | Nix et al. | 705/1 |
| 2003/0195974 A1 | 10/2003 | Ronning et al. | |
| 2004/0054650 A1 | 3/2004 | Chun | |
| 2004/0117839 A1 * | 6/2004 | Watson et al. | 725/87 |
| 2004/0166834 A1 | 8/2004 | Omar et al. | |
| 2004/0194069 A1 * | 9/2004 | Surasinghe | 717/136 |
| 2004/0266533 A1 * | 12/2004 | Gentles et al. | 463/42 |
| 2005/0033728 A1 | 2/2005 | James et al. | |
| 2005/0037740 A1 | 2/2005 | Smith et al. | |
| 2005/0043020 A1 | 2/2005 | Lipsanen et al. | |
| 2005/0153741 A1 | 7/2005 | Chen et al. | |
| 2005/0192878 A1 * | 9/2005 | Minear et al. | 705/34 |
| 2005/0282490 A1 | 12/2005 | Nurmi | |
| 2006/0107327 A1 * | 5/2006 | Sprigg et al. | 726/26 |
| 2006/0206587 A1 * | 9/2006 | Fabbrocino | 709/219 |
| 2006/0224943 A1 | 10/2006 | Snyder et al. | |
| 2007/0106745 A1 * | 5/2007 | Sakoh et al. | 709/217 |
| 2007/0130156 A1 * | 6/2007 | U. Tenhunen et al. | 707/10 |
| 2007/0171880 A1 * | 7/2007 | Ismail | 370/338 |

FOREIGN PATENT DOCUMENTS

| | | |
|---|---|---|
| JP | 1999-065828 A | 3/1999 |
| JP | 2001-273147 A | 10/2001 |
| JP | 2001-300144 | 10/2001 |
| JP | 2002-169822 | 6/2002 |
| JP | 2002-189601 A | 7/2002 |
| JP | 2002-342290 A | 11/2002 |
| JP | 2002-540492 A | 11/2002 |
| JP | 2003-005883 A | 1/2003 |
| JP | 2003-141419 A | 5/2003 |
| JP | 2003-162414 | 6/2003 |
| JP | 2004-030189 A | 1/2004 |
| JP | 2004-86409 A | 3/2004 |
| JP | 2004-113490 A | 4/2004 |
| JP | 2004-512578 A | 4/2004 |
| JP | 2004-164299 A | 6/2004 |
| JP | 2005-011148 | 1/2005 |
| JP | 2005-011218 A | 1/2005 |
| JP | 2005-100435 | 4/2005 |
| KR | 2002-0003541 | 1/2002 |
| KR | 2002-0067248 | 8/2002 |
| KR | 2003-0030586 | 4/2003 |
| KR | 10-0389093 | 6/2003 |
| KR | 10-389093 | 6/2003 |
| KR | 2003-073855 | 9/2003 |
| KR | 2004-009097 | 1/2004 |
| KR | 2004-0032010 | 4/2004 |
| KR | 2004-093583 | 11/2004 |
| KR | 2004-0096332 | 11/2004 |
| KR | 2005-001174 | 1/2005 |
| KR | 10-2000-0054477 A | 9/2007 |
| WO | WO 00/033193 A1 | 6/2000 |
| WO | WO 02/41147 A1 | 5/2002 |
| WO | WO 2004/111905 A1 | 12/2004 |

OTHER PUBLICATIONS

Extended European Search Report for European Patent Application No. 06 74 7364 dated Jun. 11, 2010 by European Patent Office.
Japanese Office Action dated Oct. 12, 2010.
Japanese Office Action for Japanese Application No. 2007-533409 dated Dec. 14, 2009 by Japanese Patent Office.
International Search Report for International Application No. PCT/KR2006/001369 dated Jul. 24, 2006 by Korean Intellectual Property Office.
Lunux magazine, JP, Feb. 1, 2005, vol. 7, pp. 148-153.
Directions on Microsoft, JP, Mar. 16, 2005, vol. 1, pp. 39-48.
Notice of Reason for Rejection for Japanese patent application No. 2007-531090 dated Jul. 16, 2009.
International Search Report for International Application No. PCT. KR2006/001398 dated Jul. 10, 2006 by Korean Intellectual Property Office.
Notice of Reason for Rejection for Japanese Patent Application No. 2007-534522 dated Sep. 10, 2009 by Japanese Patent Office.
Office Action for U.S. Appl. No. 11/725,229 dated Jul. 7, 2010.
Office Action for U.S. Appl. No. 11/724,698 dated Oct. 6, 2010.
European Search Report dated Jul. 29, 2010.
Office Action for U.S. Appl. No. 11/725,229 dated Jan. 8, 2010 by U.S. Patent and Trademark Office.
International Search Report for International Application No. PCT/KR2006/001355 dated Jul. 21, 2006 by Korean Intellectual Property Office.
Final Office Action for U.S. Appl. No. 11/724,698 dated Apr. 30, 2010 by U.S Patent and Trademark Office.
Window 2000 Service Pack 1 basic Q&A, Windows 2000 World, Japan, IDG Japan Incorporation, Jan. 1, 2001, vol. 6, No. 1, pp. 259-265.
Japanese Office Action for Japanese Patent application No. 2007-531090 dated Jan. 12, 2010 by Japanese Patent Office.
United States Notice of Allowability in U.S. Appl. No. 11/725,229 dated Jan. 18, 2012.
United States Notice of Allowability in U.S. Appl. No. 11/725,229 dated Dec. 29, 2011.
United States Notice of Allowability in U.S. Appl. No. 11/725,229 dated Nov. 21, 2011.

* cited by examiner

| GAME CONTENT MAIN NAME(ID) |
| --- |
| CONTENT UNIFIED VERSION |
| NUMBER OF GAME EXECUTION FILE |
| GAME EXECUTION FILE CONFIGURATION DATA |
| NUMBER OF ITEM FILE |
| ITEM FILE CONFIGURATION DATA |

FIG. 4

| EXECUTABLE FILE ID | VERSION DATA | SIZE | BILLING DATA |
|---|---|---|---|

| ITEM FILE ID | GAME CONTENT MAIN NAME(ID) | VERSION DATA | SIZE | BILLING DATA |
|---|---|---|---|---|

FIG. 14
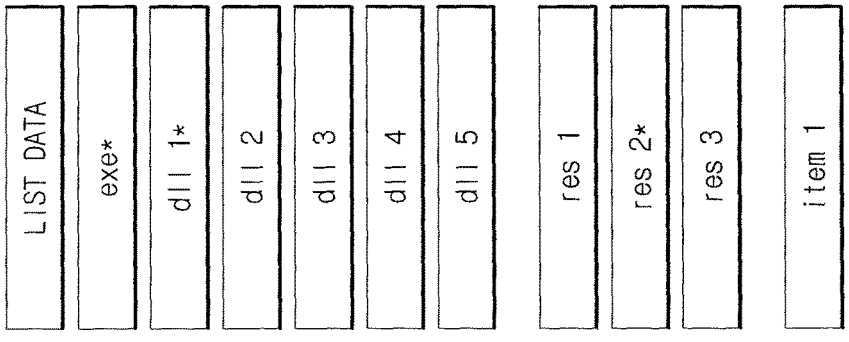
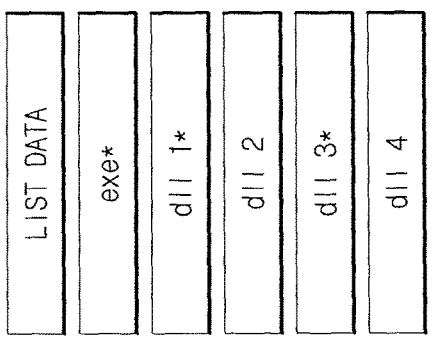
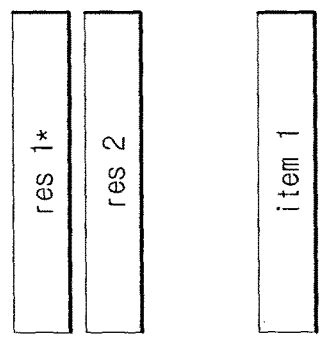
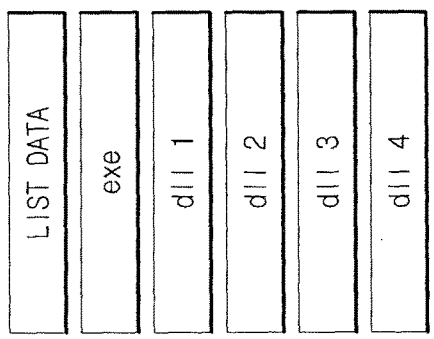
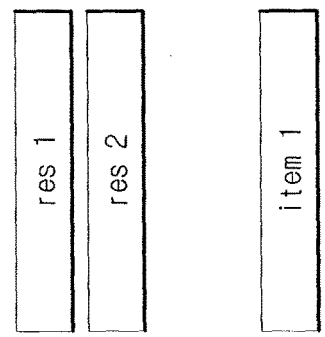

| ITEM FILE ID |
| VERSION DATA |
| SIZE |
| BILLING DATA |
| ⋮ |
| ITEM FILE ID |
| VERSION DATA |
| SIZE |
| BILLING DATA |

METHOD FOR PROVIDING CONTENTS

RELATED APPLICATIONS

This application is a continuation application, and claims the benefit under 35 U.S.C. §§ 120 and 365 of PCT Application No. PCT/KR2006/001355, filed on Apr. 12, 2006, which is hereby incorporated by reference in its entirety.

BACKGROUND

Field

The present invention relates to a method and system of providing content having sub-content file structure, particularly, a method and system of efficiently billing for content.

Description of the Related Technology

Due to the development of mobile communication technology, these days almost everyone possesses a mobile communication terminal. Everyday life now changes with the mobile communication terminal, which everyone carries around all the time. A digital camera and/or MP3 player has been combined with the mobile communication terminal, and even the navigation or location based service (LBS) is available in a modern mobile communication terminal. In addition, playing a game on a terminal has become a pastime for almost everyone.

But, due to a limit to the embedded memory of the mobile communication terminal and a transmission speed when downloading via wireless network, large size game content over 5 Mbytes has not been popular. Thus, the mainstream games for the mobile communication terminal have included board games such as very simple and small size puzzle games or card games. In that environment, since the size of game content was very small, the game content had one file, and it was no problem to change new content as whole if there was a change in an item being used in game.

But, now that the adoption of external memory gives a room for storing and wireless network provides faster download speed, the game contents having over 20~100 Mbytes are on high demand for providing stylish images and in-depth games. However, there are some problems in downloading content as a whole whenever there is a small change in items of the game, which is charged per packet and takes long time to download the whole content.

SUMMARY OF CERTAIN INVENTIVE ASPECTS

Thus, to overcome the aforementioned problems, one aspect of the present invention provides a method and system of transmitting item files of game content, and allows adding and changing extension data without changing an execution file by using list data in downloading the game content only.

Another aspect of the present invention provides a method and system of billing for downloading the extension data of game content.

Still another aspect of the present invention provides a method and system of fixed billing for content having sub-content file structure, which is for billing content regardless of amount of packets.

Still another aspect of the present invention provides a method and system of fixed billing for content having sub-content file structure, which is for billing a patch or an extension pack rather than a basic content.

According to the first embodiment of the present invention, there is provided a game content server of selling game content, comprising: a game content list providing module, providing a game content list to a mobile communication terminal; a package list generating module, generating package list comprising data of a game execution file and an item file, wherein, the game execution file and the item file are included in the game content; a compiling (COD) module configured to compile the game execution file; an application transmitting module configured to transmit the game execution file compiled by the compiling module to the mobile communication terminal; a resource transmitting module configured to transmit the item file to the mobile communication terminal; and a billing module configured to request transaction of a payment for the game content to the mobile communication terminal and activate the application transmitting module and the resource transmitting module on receiving a transaction completion signal.

The billing module extracts billing data from the game execution file and billing data from the item file and requests transaction of a payment to the mobile communication terminal.

According to another aspect of the present invention, there is provided a method of transmitting game content comprising a game execution file and an item file with charge through a game content server, comprising: (a) receiving a transmission request of a game content list from a mobile communication terminal; (b) transmitting the game content list that is searched in a database to the mobile communication terminal; (c) receiving a purchase request for the game content from the mobile communication terminal, wherein the game content is in the game content list; (d) requesting transaction of a payment to the mobile communication terminal by extracting billing data from the game execution file and the item file of the game content; (e) receiving a transaction completion signal from the mobile communication terminal; and (f) transmitting the game content to the mobile communication terminal.

Transmitting (f) is transmitting package list data that is generated by the game content server and comprises data relating to the game execution file and the item file to the mobile communication terminal, and transmitting the game execution file and the item file to the mobile communication terminal, respectively.

According to still another aspect of the present invention, there is provided item server of game content with charge, comprising: an item list providing module configured to provide an item list to a mobile communication terminal; a resource transmitting module configured to transmit the item file to the mobile communication terminal, wherein the item file is in the item list; and a billing module configured to request transaction of a payment for the item file to the mobile communication terminal and activate the resource transmitting module on receiving a transaction completion signal, wherein the game content comprises at least one game execution file, data relating to the game execution file is managed by a package list data, and the mobile communication terminal receives the item file to update the package list data to include data of the item file.

According to still another aspect of the present invention, there is provided an item server of game content with charge, comprising: an item list providing module configured to provide an item list to a first mobile communication terminal; a resource transmitting module configured to transmit the item file to a second mobile communication terminal corresponding to identification data received from the first mobile communication terminal, wherein the item file is in the item list and the identification data comprises phone number or mobile identification number (MIN); and a billing module configured to request transaction of a payment for the item file to the first mobile communication terminal and activate the resource transmitting module on receiving a transaction completion signal for the item file, wherein the game content comprises at least one game execution file, data relating to the game execution file is managed by a package list data, and the mobile communication terminal receives the item file to update the package list data to include data of the item file.

Another aspect is an item transmitting system of game content with charge, comprising: an item server, comprising an item list providing module, providing an item list to a mobile communication terminal and a resource transmitting module, transmitting the item file to the mobile communication terminal, wherein the item file is in the item list item server; and a billing server, receiving a billing process request for the item file from the item server, requesting transaction of a payment for the item file to the mobile communication terminal, and transmitting a transaction completion signal to the item server when the transaction completes, wherein the transaction completion signal activates the resource transmitting module, the game content comprises at least one game execution file, data relating to the game execution file is managed by a package list data, and the mobile communication terminal receives the item file to update the package list data to include data of the item file.

According to another aspect of the present invention, there is provided an item transmitting system of game content with charge, comprising: an item server, comprising an item list providing module, providing an item list to a first mobile communication terminal and a resource transmitting module, transmitting the item file to a second mobile communication terminal corresponding to identification data being received from the first mobile communication terminal, wherein the item file is in the item list and the identification data is phone number or MIN; and a billing server, receiving a billing process request for the item file from the item server, requesting transaction of a payment for the item file to the first mobile communication terminal and transmitting a transaction completion signal to the item server when the transaction completes, wherein the transaction completion signal activates the resource transmitting module, the game content comprises at least one game execution file, data relating to the game execution file is managed by a package list data, and the mobile communication terminal receives the item file to update the package list data to include data of the item file.

The mobile communication terminal may search the package list data corresponding to the received item file and makes the item file be dependent to specific game content according to the package list data.

According to still another aspect of the present invention, there is provided a method of transmitting item file of game content with charge through an item server, comprising: (a) receiving a transmission request of an item list from a mobile communication terminal; (b) transmitting the item list to the mobile communication terminal by searching database; (c) receiving a purchase request for the item file from the mobile communication terminal, wherein the item file is in the item list; (d) requesting transaction of a payment to the mobile communication terminal by extracting billing data from the item file; (e) receiving a transaction completion signal from the mobile communication terminal; and (f) transmitting the item file to the mobile communication terminal, wherein the game content comprises at least one game execution file, data relating to the game execution file is managed by a package list data, and the mobile communication terminal receives the item file to update the package list data to include data of the item file.

The method further comprises between receiving (c) and requesting (d): (c-1) transmitting the game content data corresponding to the item file to the mobile communication terminal; and (c-2) receiving a download available signal of the item file from the mobile communication terminal, wherein the mobile communication terminal receives the game content data to check if the game content corresponding to the game content data is stored and transmits the download available signal if stored according to the result.

Also, transmitting (f) is, if the transmission of the item file was suspended, comparing a size of the downloaded item file and continuously downloading from the point where the downloading was suspended, and after transmitting (f), the mobile communication terminal searches the package list data corresponding to the received item file and makes the item file be dependent to specific game content according to the package list data.

According to still another aspect of the present invention, there is provided a method of transmitting item file of game content with charge through an item server, comprising: (a) receiving a transmission request of an item list from a mobile communication terminal; (b) transmitting the item list to the mobile communication terminal by searching database; (c) receiving identification data of gift requesting and gift receiving mobile communication terminal from the mobile communication terminal, wherein the item file is in the item list and the identification data is phone number or mobile identification number (MIN); (d) requesting transaction of a payment to the mobile communication terminal by extracting billing data from the item file; (e) receiving a transaction completion signal from the mobile communication terminal; and (f) transmitting the item file to the gift receiving mobile communication terminal corresponding to the identification data of the gift receiving mobile communication terminal, wherein the game content comprises at least one game execution file, data relating to the game execution file is managed by a package list data, and the mobile communication terminal receives the item file to update the package list data to include data of the item file.

Transmitting (f) comprises: (f-1) transmitting gift receiving data of the item file to the gift receiving mobile communication terminal; and (f-2) receiving a transmission request for the item file from the gift receiving mobile communication terminal, wherein according to the transmission request, the item file is transmitted to the gift receiving mobile communication terminal.

Also, the gift receiving data is transmitted via SMS URL callback or email, and transmitting (f) is, if the transmission of item file was suspended, comparing a size of the downloaded item file and continuously downloading from the point where the downloading was suspended, and after transmitting (f), the mobile communication terminal searches the package list data corresponding to the received item file and makes the item file be dependent to specific game content according to the package list data.

In addition, according to another embodiment of the present invention, there is provided a fixed rate billing method through a content providing server providing multimedia content to a mobile communication terminal being connected through network, comprising: (a) receiving transmission request data of content comprising sub-content files from the mobile communication terminal, wherein the sub-content files comprises at least one of an execution file, dynamic link library (DLL) file and resource file; (b) generating package list data for the requested content, wherein the package list data comprises data relating to at least one file having billing command; (c) transmitting the package list data to the mobile communication terminal; (d) transmitting sub-content files comprising content to the mobile communication terminal according to the package list data; and (e) billing based on the file having billing command.

The method may further comprise: (f) counting the amount of packets of the file having billing command; and (g) converting the counted amount of packets into a predetermined amount of packets if the content is a target of fixed rate billing, wherein billing (e) is billing by applying a predetermined rate to the converted amount of packets.

The method may process a billing exemption for the other files except the file having billing command.

Generating (b) may be generating the package list relating to sub-content files having non-billing command if the transmission request is for transmitting patch file.

The content transmission request data comprises appl ID and unified version data of content, wherein the unified version data is for identifying basic content and extension content, wherein if the requested content is the extension pack, then generating (b) generates the package list data corresponding to the extension pack, wherein the package list data corresponding to the extension pack comprises data relating to at least one first file having billing command among sub-content files of the basic content's own and data relating to at least one second file having billing command among the sub-content files of the extension pack's own.

At this, if the mobile communication terminal does not store the basic content corresponding to the requested extension pack, billing (e) is billing based on the converted amount of packets of the first file and the second file.

Also, if the mobile communication terminal stores the basic content corresponding to the requested extension pack, billing (e) is billing based on the converted amount of packets of the second file.

The content providing server may provide at least one extension pack having different unified version and the billing command is assigned to a different file according to the unified version of the extension pack.

The content providing server may provide at least one extension pack having different unified version and throughout the at least one extension pack, the billing command is designated to same file, wherein converting (g) is converting the file having billing command into different amount of packets according to the different unified version of each extension pack.

According to another aspect of the present invention, there is a storage medium including a program containing digital processing device execution instructions for performing the method of billing multimedia content having sub-content file structure, comprising: (a) receiving transmission request data of the content comprising sub-content files from a mobile communication terminal, wherein the sub-content files comprises at least one of an execution file, DLL file and resource file; (b) generating package list data for the requested content, wherein the package list data comprises data relating to at least one file having billing command; (c) transmitting the package list data to the mobile communication terminal; (d) transmitting sub-content files comprising the content to the mobile communication terminal according to the package list data; and (e) billing based on the file having the billing command.

According to still another aspect of the present invention, there is a fixed rate billing system, comprising: a content providing server, being connected to a mobile communication terminal via network, receiving transmission request data of content comprising sub-content files from the mobile communication terminal, wherein the sub-content files comprises at least one of an execution file, DLL file and resource file, generating package list data for the requested content, wherein the package list data comprises data relating to at least one file having billing command, transmitting the package list data to the mobile communication terminal, and transmitting sub-content files comprising the content to the mobile communication terminal according to the package list data; and a billing server, billing based on the file having the billing command.

BRIEF DESCRIPTION OF DRAWINGS

FIG. 3 shows package list data of game content according to an embodiment of the present invention;

FIG. 4 is a configuration illustrating data of an execution file according to the present invention;

FIG. 8 is a configuration illustrating an item file to be additionally provided according to an embodiment of the present invention;

FIG. 14 shows one example of list data of a patch file of a sub-content file package and an extension pack being generated according to another embodiment of the present invention;

FIG. 17 is a configuration illustrating data of game execution file according to an embodiment of the present invention.

DETAILED DESCRIPTION OF CERTAIN INVENTIVE EMBODIMENTS

The aforementioned objects, features and advantages will be more apparent from the following description in relation to accompanying drawings. In numbering elements in each drawing, same elements appearing on different drawings will have same reference number as possible. Hereinafter, the embodiments of present invention will be described in detail with reference to accompanying drawings.

(1) First Embodiment

Figure 1:
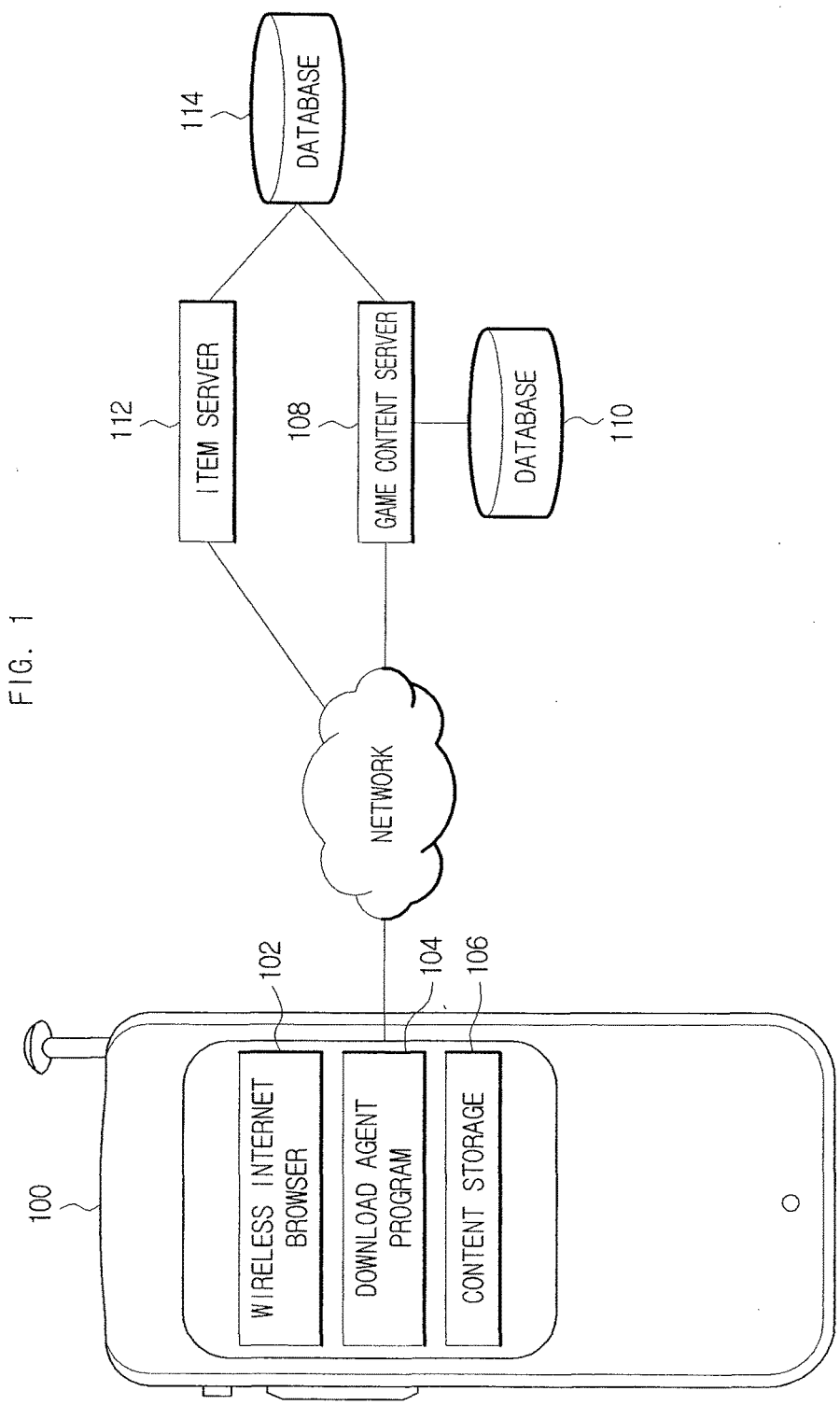
FIG. 1 shows a game content system according to the present invention.

FIG. 1 shows a game content system according to an embodiment of the present invention. Referring to FIG. 1, the game content system comprises a mobile communication terminal 100 and a game content server 108.

The mobile communication terminal 100 comprises a wireless Internet browser 102, a download agent program 104 and a content storage 106. The wireless Internet browser 102 enables the mobile communication terminal to perform data communication. The mobile communication terminal 100 communicates data to and from each server on wireless network through the wireless Internet browser 102. The download agent program 104 checks the completion of transmission, need of patch, etc., when downloading game content. The download agent program 104 will be described in more detail with reference to FIG. 5. The content storage 106 stores each game content that is received via wireless network. The content storage 106 may be an internal memory of the mobile communication terminal 100 or external memory that can be attached.

Here, the mobile communication terminal 100 has a content management system with directory or folder structure that allows managing plural game content respectively. The game content can include sub-content files including more than two files.

The game content server 108 provides various kinds of game content to the mobile communication terminal 100 on wireless network. The game content server 108 may comprise game content database 110 in itself or provide game content that an external content provider provides to the mobile communication terminal 100. The method that the game content server 108 provides game content to mobile communication terminal 100 will be described with reference to FIG. 2.

If extension data (hereinafter referred to as 'item file') is downloaded additionally after download of game content, the game content system according to the present invention may further comprise an item server 112.

The item server 112 provides an item file additionally to the mobile communication terminal 100, received specific game content from the game content server 108 via wireless network. The item file cannot change a game execution file being included in specific game content that the mobile communication terminal received. But, it provides additional data or function when using specific game content. In order to improve fun of game without changing an execution file of game, the item file may be one of background screen of game, item that a game character uses, game map, game character and so on. The item server 112 may comprise an item database 114 in itself or be provided from external content provider to provide an item file to the mobile communication terminal 100. The item server 112 will be described with reference to FIG. 7.

Hereinafter, the method of billing with downloading both game execution file and item file together in downloading game content will be described.

Figure 2:
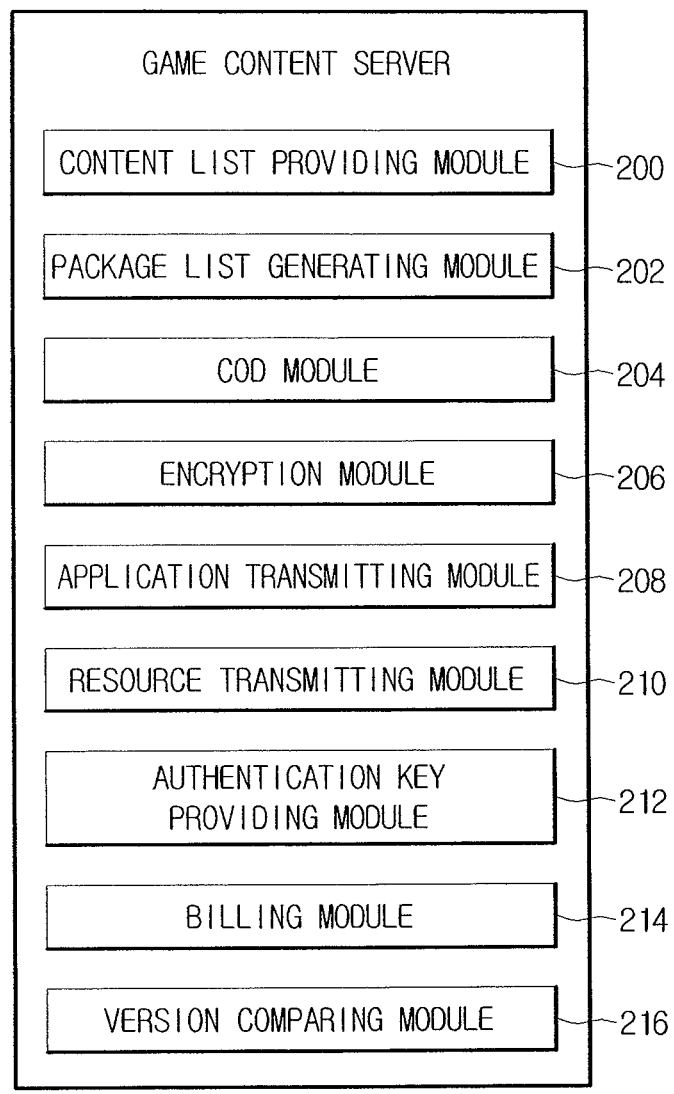
FIG. 2 shows a game content server according to the present invention.

FIG. 2 shows a game content server 108 according to the present invention. Referring to FIG. 2, the game content server 108 comprises a content list providing module 200, a package list generating module 202, a COD module 204, an application transmitting module 208, and a resource transmitting module 210 (or further comprises an encryption module 206, an authentication key providing module 212, and a version comparing module 214).

The content list providing module 200 provides a list of game content for a user to select desired game content. The content list can be provided through landline/wireless portal site, and the user receives the content list by computer or mobile communication terminal 100.

The package list generating module 202 generates a package list for files of game content that a user selects to download in the content list. Game content that the user selects is content including more than one file. Since it is difficult to transmit plural files simultaneously or at once via wireless network, it is frequently suspended in the middle of download. In this case, information about which content is suspended and which file can be downloaded is needed. For this, the package list generating module 202 to generate a package list including data of each file of game content is necessary. The package list includes data for game execution file or item file. The package list will be described in detail with reference to FIG. 3.

The COD module 204 compiles a program made by JAVA to an execution image that can be run on WIPI platform. Namely, the COD module compiles files that needs to be compiled to run on the mobile communication terminal 100 among plural files included in the game content.

The encryption module 206 encodes game content by using DRM technology, so that an authorized person only uses the game content. DRM represents 'Digital Right Management' and means digital copyright management. As a technology and server for protecting profit and right of those who have copyrights by prohibiting illegal use of digital content, this technology is collectively responsible for from generation to distribution/management of content including protection of right and profit of a content provider, prevention from illegal reproduction or duplication, billing for usage, payment agency, and so on. This includes a digital copyright management technology of allowing authorized persons only to use content and to pay charge therefore, software and security technology for authorizing and enforcing copyright, and payment/billing technology. Content identifier DOI (Digital Object Identifier), INDECS for storing data required for electronic trade, watermarking technology for preventing illegal reproduction/duplication and distortion are supporting. DOI is an identification number assigned to digital content, watermarking is the technology of inserting secret information into digital data and identifying who the true digital copyrighter is when a copyright dispute happens. By adopting a security authorization system to content, the use of content without paying a certain amount of charge can be prevented.

The authentication key providing module 212 provides authentication document or authentication key to use game content in the mobile communication terminal 100. Since game content is encoded by the encryption module 206, the authentication document or authentication key is needed to use the encoded content.

It is possible for the game content server 108 to receive already-encoded content when receiving game content from an external content provider. In this case, the encryption module is not needed, however, the authentication key providing module 212 is needed to allow use of the encoded game content in the mobile communication terminal 100.

In an embodiment of the present invention, if it fails to get authentication from the authentication key providing module 212, any user of the mobile communication terminal 100 cannot use the game content that is encoded by the encryption module 206 or an external content provider even if the user downloaded the game content.

The application transmitting module 208 transmits application including plural files being compiled by the COD module 204. The resource transmitting module 210 transmits resource files that do not need to be compiled. In transmitting wireless data over the existing mobile communication system, compiled files and un-compiled files can be transmitted by different ways. Thus, the game execution file and the item file are transmitted by the application transmitting module 208 and the resource transmitting module 210, respectively. The game execution file needed to be compiled through the application transmitting module 208 and the item files not needed to be compiled through the resource transmitting module 210 can be transmitted. Here, the game execution file comprises EXE file, DLL file, etc, and the item file comprises RES file and ITEM file.

The billing module 214 demands charge to the mobile communication terminal when receiving a purchase request for game content from the mobile communication terminal 100. If the mobile communication terminal 100 reports that the charge for the game content is paid by a small amount transaction and so on, then the billing module recognizes a transaction completion and activates the encryption module 206, the resource transmitting module 210 and the authentication key providing module 212 to approve the encryption, transmission and authentication of game execution file and item file, both included in the game content.

In billing with providing game content, it is also possible to perform the billing by using a billing server (not shown) that was used in the existing mobile communication system without using the billing module 214. In this case, the game content server 108 transmits billing data corresponding to requested game content to the billing server. The billing server requests a transaction to the mobile communication terminal 100 and reports the completion of transaction to the game content server 108 if the transaction completes. Then, the game content server 108 activates the encryption module 206, the resource transmitting module 210 and the authentication key providing module 212 to approve the encryption, transmission and authentication of game execution file and item file, both included in game content.

In addition, the version comparing module 216 can be further comprised. The version comparing module 214 can be divided into a package comparing part (not shown) and an individual file comparing part (not shown). It is needed to provide an extension pack because game content that was already transmitted to the mobile communication terminal 100 is changed on the whole, or it is needed to be patched because some of plural files included in game content are modified or updated. In this case, it is possible to provide extension pack or patch file by the package comparing part to compare a unified version or by the individual file comparing part to compare sizes of each file or individual versions.

FIG. 3 shows package list data of game content according to an embodiment of the present invention. FIG. 4 and FIG. 17 show configuration data of a game execution file and an item file according to the present invention.

Referring to FIG. 3, package list data 300 comprises a game content name (or game content ID) for identifying game content from other contents, a game content unified version for indicating update data of game content, the number and configuration data of game execution files included in game content, and the number and configuration data of item files. Here, if an item file is added according to another embodiment of the present invention, the package list data 300 may change the number and configuration data of item files.

Referring to FIG. 4, the game execution file 400 comprises a game execution file ID for identifying itself, version data for indicating update data of the game execution file, a size for indicating size of the game execution file, and billing data for indicating that the game execution file is charged or not when downloading the game execution file. Here, the game execution file may be in the form of one execution file or include plural files. Similarly to this, referring to FIG. 17, the item file 410 comprises an item file ID, version data, size and billing data. The additional item file to be additionally downloaded after downloading game content will be described with reference to FIG. 6.

In the present invention, the game execution file 400 is for executing game content on the mobile communication terminal 100, and may be EXE file, DLL files and so on. DLL file is a dynamic link library file, and a set of small programs. Any of DLL files can be called, if needed, by a large program (execution file) running on the mobile communication terminal 100. The advantage of DLL files is saving RAM space because these files are not loaded together with a main program. DLL file is loaded and executed only when needed. And, in the present invention, the execution file and DLL file are compiled to be an execution image that can be operated on WIPI platform by the COD module 204 of the game content server 108, and are downloaded to the mobile communication terminal 100 by the application transmitting module 208.

The item file is a resource file which means a file relating to background to be displayed during the game, game characters and so on. It is not needed to be compiled by the COD module 204 of the game content server 108, and is transmitted to the mobile communication terminal 100 by the resource transmitting module 210.

Figure 5:
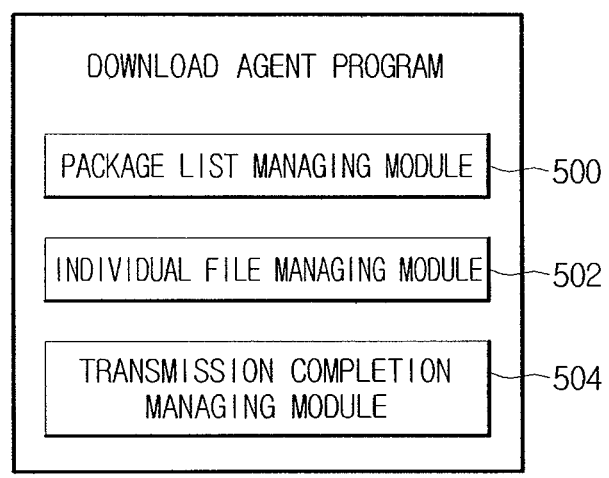
FIG. 5 shows a download agent program according to an embodiment of the present invention.

FIG. 5 shows a configuration of download agent program according to the present invention. The download agent program 104 comprises a package list managing module 500, an individual file managing module 502, and a transmission completion checking module 504.

The download agent program 104 is included in the mobile communication terminal 100, and in downloading game content checks if download completes, if patch is needed, and so on.

Before downloading the game content from the game content server 108, the package list managing module 500 requests and downloads package list data 300 of the game content. And, the package list managing module 500 controls the individual file managing module 502 to download game execution files and item files from the application transmitting module 208 and the resource transmitting module 210 of the game content server 108, respectively, based on data of the game execution files and item files in the package list data 300. It is possible to update an item file by amending the package list data 300 if an item file is additionally downloaded later.

The individual file managing module 502 downloads compile-required files and compile-not-required files separately when downloading game content from the game content server 108. The compile-required game execution file 400 is transmitted by the application transmitting module 208, and the compile-not-required item file 410 is transmitted by the resource transmitting module 210.

The transmission completion checking module 504 checks if download of all files completes when downloading a large size file. Since it is difficult to download a large size file at one time through wireless network, download may be suspended due to disconnection during downloading one file. In this case, the already-downloaded part of the suspended file is temporarily stored in memory of the mobile communication terminal 100. When being connected to wireless network again, the remaining part can be continuously downloaded. The point where download starts again may be identified by comparing size of the downloaded part.

Also, in transmitting game content including plural files, it is also difficult to download all files at one time. In this case, a package list of the game content to be downloaded is first transmitted. And then game execution files, item files, etc., in the package list are downloaded. Since the downloaded files and files to be downloaded can be distinguished based on the received package list data 300 even if download is suspended, it is possible to continuously download from the point where the download is suspended.

Figure 6:
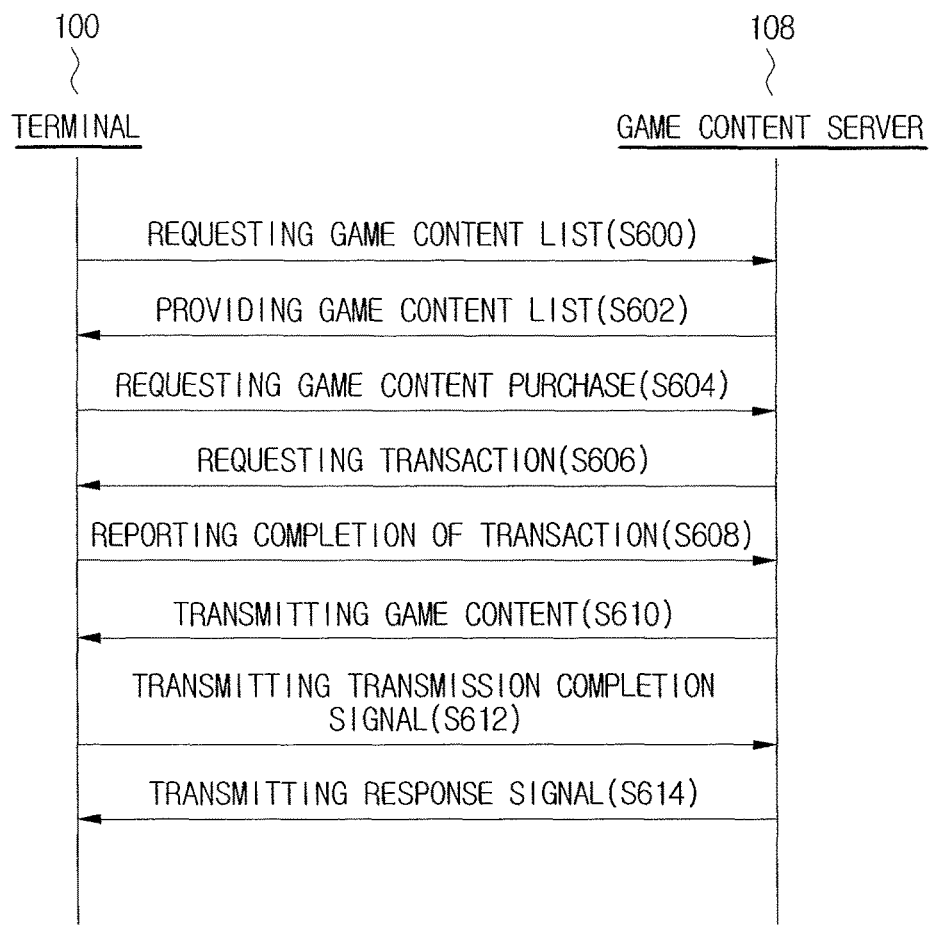
FIG. 6 is a flowchart of a billing method while a game execution file and an item file are simultaneously downloaded according to an embodiment of the present invention.

FIG. 6 is a flowchart of a billing method while a game execution file and an item file are simultaneously downloaded according to an embodiment of the present invention.

Referring to FIG. 6, at S600, the mobile communication terminal 100 requests a list of game content to the game content server 108. At S602, the game content server 108 generates the list of game content that is stored in its database or is provided from an external content provider and transmits it to the mobile communication terminal 100. At S604, the mobile communication terminal 100 requests for purchase for game content desired to download in the received list of game content. This embodiment relates to download game content including both the game execution file 400 and the item file 410. At S606, the game content server 108 extracts billing data included in the game execution file 400 and billing data included in the item file 410. And, the game content server 108 requests a transaction based on each billing data to the mobile communication terminal 100. The request of transaction can be performed by the game content server 108, or by a billing server, which was used in the existing mobile communication system, as response to a request from the game content server 108. At S608, the mobile communication terminal 100 pays data usage charge for the game execution file 400 and the item file 410 included in the game content by a small amount transaction, etc. And, transaction completion data is transmitted to the game content server 108. Here, if the transaction request is made by the billing server, the billing server can report data of transaction completion to the game content server 108.

At S610, the game content server 108 transmits the paid game content to the mobile communication terminal 100. At step S612, when the download completes, the mobile communication terminal 100 transmits a transmission completion signal to the game content server 108. At S614, the game content server 108 transmits a response signal for the transmission completion signal to the mobile communication terminal 100.

In the above, the method of billing while game execution files and item files are simultaneously downloaded was described.

Hereinafter, a method of billing for additionally downloading item files only when the mobile terminal already stores game content will described in detail.

Figure 7:
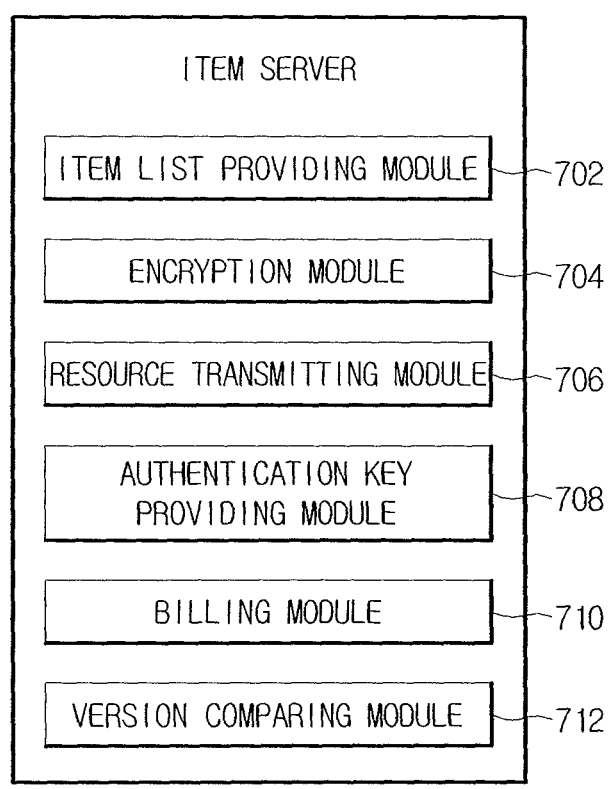
FIG. 7 is a block diagram of an item server according to an embodiment of the present invention.

FIG. 7 is a block diagram of an item server according to an embodiment of the present invention. The item server 112 transmits item files without changing game content, which was transmitted to the terminal, such as the game execution file 400 in the game content, and bills for data usage.

Referring to FIG. 7, the item server 112 comprises an item list providing module 702, an encryption module 704, a resource transmitting module 706, an authentication key providing module 708, and a billing module 710.

The item list providing module 702 provides a list of items corresponding to each game content for a user to select a desired item. The item list can be provided through landline/wireless portal, and a user can receive the item list by computer or mobile communication terminal 100.

The encryption module 704 encodes the item file for the authorized user only to use the item file by using DRM technology. By adopting the security authorization system to each item file, the use of content without paying a certain amount of charge can be prevented.

The authentication key providing module 708 provides authentication document or authentication key to use the item file received from the mobile communication terminal 100. Since the item file is encoded by the encryption module 206, the authentication document or authentication key is needed to use the encoded content. Namely, the encryption module 704 and the authentication key providing module 708 are provided by a pair.

In an embodiment of the present invention, if it fails to get authentication from the authentication key providing module 708, the user of the mobile communication terminal 100 cannot use the item file that is encoded by the encryption module 704 even if the user downloaded or copied the item file.

Encryption of the item file can be performed by an external item provider, and in this case, the item server may not comprise the encryption module 704 and the authentication key providing module 708.

The resource transmitting module 706 transmits compile-not-required resource files. Since the item file is a resource file, it is downloaded to the mobile communication terminal 100 by the resource transmitting module 706 that transmits without compile.

The billing module 710 demands a payment of usage charge to the mobile communication terminal 100 when receiving a purchase request of an item file from the mobile communication terminal 100. If the mobile communication terminal 100 reports that the charge for game content (the corresponding item file) is paid by a small amount transaction and so on, then the billing module recognizes a transaction completion and activates the encryption module 704, the resource transmitting module 706 and the authentication key providing module 708 to approve the encryption, transmission and authentication of item file.

In billing with providing item file, it is also possible to perform the billing by using a billing server (not shown) that was used in the existing mobile communication system without using the billing module 710. In this case, the item server 112 transmits billing data corresponding to the requested item file to the billing server. The billing server requests a transaction to the mobile communication terminal 100 and reports the completion of transaction to the item server 112 if the transaction completes. Then, the item server 108 activates the encryption module 704, the resource transmitting module 706 and the authentication key providing module 708 to approve the encryption, transmission and authentication of item file.

In addition, the item server 112 may further comprise a version comparing module 710. If the item file that was transmitted to the mobile communication terminal 100 is modified/changed or updated, the version comparing module 710 may perform patch of the item file by comparing the unified version or size of the item file.

The version comparing module (not shown) can be comprised in the download agent program 104 of the mobile communication terminal 100 as well as the item server 112. Namely, when the item server 112 extracts version data of an item file to be downloaded and transmits it to the mobile communication terminal 100, the version comparing module of the download agent program 104 extracts version data of the existing item file stored in the content storage 106 and compares each other. The item file can be downloaded only if the version is updated according to the comparison result.

FIG. 8 shows a configuration illustrating an item file to be additionally provided according to an embodiment of the present invention.

Referring to FIG. 8, an additional item file 800 comprises an item name, a game content main name (ID), version data of item file, size, and billing data. The item name is an identifier for distinguish each item file. The game content main name (ID) indicates data of game content to which the additional item file 800 should be included. By the game content main name (ID), the mobile communication terminal 100 searches the game content where the additional item file 800 should be stored, and stores the additional item file 800 in the predetermined lower directory of the searched game content. At this time, package list data 300 of the game content would be updated with data relating to the additional item file 800.

If the additional item file 800 is large and the download does not complete at one time, the item file is renamed as a temporary file (e.g., item.tmp, etc) and then the download proceeds. When the mobile communication terminal 100 accesses to the wireless network, a temporary file storing module (not shown), where the temporary file is stored, is searched by an auto search or a user's download continuation request. Total size of the additional item file 800 and size of currently downloaded temporary file is compared by using size data of the additional item file being stored in the temporary file storing module, and the continuous download proceeds. If total size and size of temporary file are equal, then the download completes and the temporary file is renamed as original name of the additional item file 800 to be stored in the lower directory of the corresponding game content.

In the present invention, if a large number of game content are stored in the mobile communication terminal 100, the additional item file 800 should be downloaded dependently to its corresponding game content. The game content includes many files and each file is managed by directory concept.

For example, if a specific game content was stored in "/game#1" directory, any game execution file of the game content is stored in "/game#1/exefile" directory, and any item file is stored in "/game#1/itemfile" directory. Namely, all shows that the higher directory is "/game#1" indicating the specific game content. If an additional item file 800 is downloaded additionally, the specific game content is searched by using content main name data included in the additional item file 800. And, if there is no "/game#1/itemfile" directory as a lower directory of "/game#1", then it is newly generated to download, and if there is, the additional item file 800 is downloaded to that directory so that it can be downloaded dependently to the specific game content. It is apparent that any method of downloading the additional item file 800 dependently to the specific game content may be included within the scope of range known to those who skilled in the art.

If the additional item file 800 is additionally downloaded later, the package list managing module 500 among each module of the download agent program 104 as shown in FIG. 5 has the following function.

The package list managing module 500 checks that game content corresponding to the additional item file 800 to be downloaded is already stored in the mobile communication terminal 100. If the mobile communication terminal 100 selects the additional item file 800 to download, the item server 112 transmits the game content main name (ID) corresponding to the selected additional item file 800. On receiving the game content main name, the mobile communication terminal 100 searches game content and, if there is the game content corresponding to the game content main name, the package list managing module 500 reports to the item server 112 that the download of the item file is possible. If there is no game content corresponding to the game content main name in the mobile communication terminal 100, the package list managing module 500 reports to the item server 112 that the download of the item file is not possible.

Also, when the download of the additional item file 800 completes and it is stored in a lower directory of the game content, package list data of the game content is updated. Since the downloaded additional item file becomes included in the game content, package list data 300 is also updated with data relating to the downloaded additional item file 800.

Basically, in purchase of the additional item file 800 only, it is possible in the present invention to download the additional item file 800 when a basic title (or extension pack) is not stored in the mobile communication terminal 100. Here, basic title or extension pack means game content that was already downloaded to the mobile communication terminal 100. But, it is possible to allow the download of the additional item file 800 when the basic title (or extension pack) was stored in the mobile communication terminal 100. Also, although game content is not stored in the mobile communication terminal of a user who receives the additional item file 800 as a gift, the additional item file can be downloaded by putting the gift in a gift depository or using a gift acceptance function and so on. Of course, even in this case, it is possible to allow the user who received gift to download the additional item file 800 from the gift depository after downloading the basic title or extension pack of game content to the mobile communication terminal. Hereinafter, methods of selling the additional item file 800 with data usage charge will be described with a case that a user purchases the additional item file 800 and downloads it to his own mobile communication terminal 100 and a case that a user purchases the additional item file 800 and downloads it to another's mobile communication terminal 100.

Figure 9:
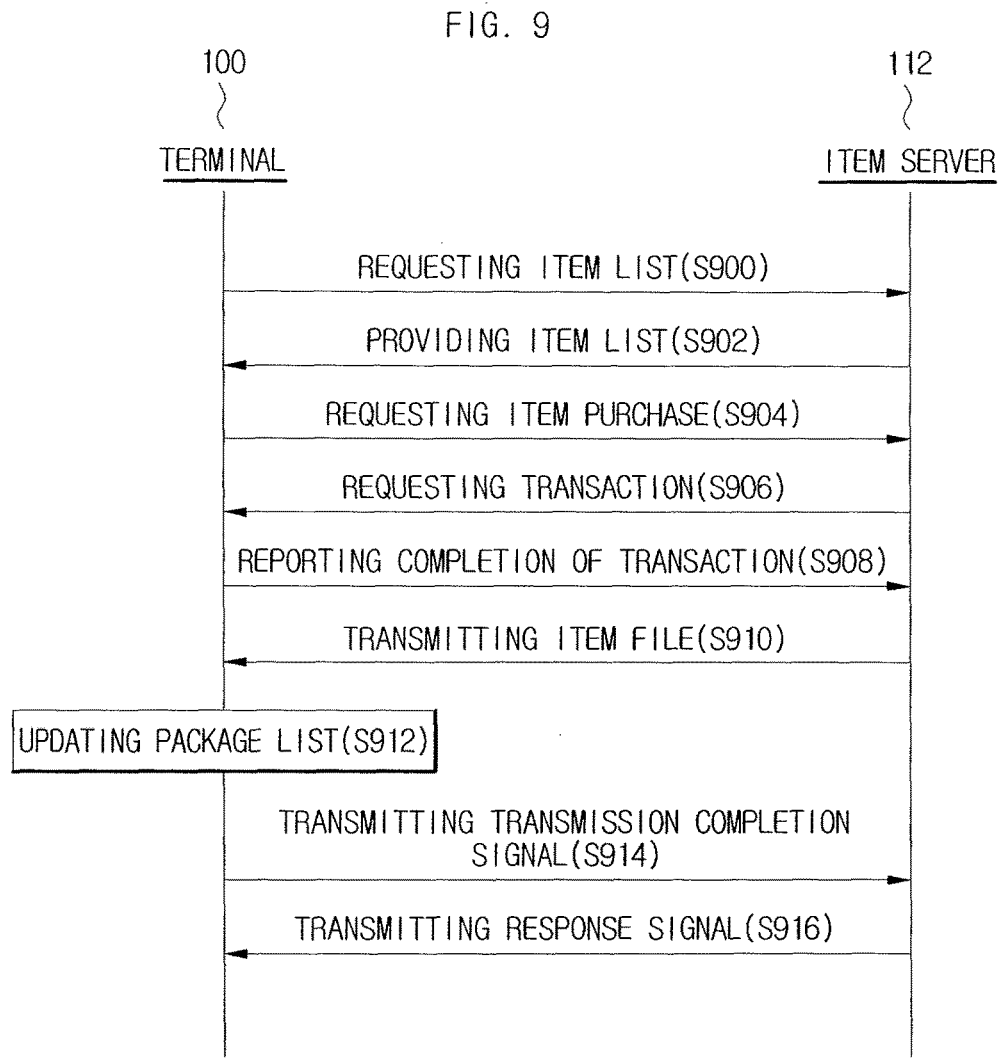
FIG. 9 is a flowchart of selling an additional item file with data usage charge to a buyer according to an embodiment of the present invention.

FIG. 9 is a flowchart of selling an additional item file 800 with data usage charge to a buyer according to an embodiment of the present invention. It describes the case of receiving a purchase request of an additional item file 800 from the mobile communication terminal 100 that already stores game content corresponding to the additional item file 800.

Referring to FIG. 9, at S900, the mobile communication terminal 100 requests an item list to the item server 112 via landline/wireless portal. At S902, the item server 112 searches a list of item file from its database 114 or an external item file provider and transmits it to the mobile communication terminal 100. At S904, the mobile communication terminal 100 selects a desired item from the item list and requests for item purchase. In this case, to item to purchase may be one or more than two. At S906, the item server 112 extracts billing data from file data of the item to purchase and demands transaction of a payment to the mobile communication terminal 100. The request of transaction can be performed by the item server 112, or by a billing server, which was used in the existing mobile communication system, as response to a request from the item server 112. At S908, the mobile communication terminal 100 pays data usage charge for the item to purchase by a small amount transaction, etc. And, transaction completion data is transmitted to the item server 112. Here, if the transaction request is made by the billing server, the billing server can report data of transaction completion to the item server 112.

At S910, the item server 112 transmits the additional item file 800 to the mobile communication terminal 100 that paid data usage charge. At this, since the additional item file 800 is extension data used only for specific game content, it should be stored in a lower directory of that game content. Thus, the item server 112 may transmit amended package list data including data of the additional item file 800. Or, the mobile communication terminal 100 can amend package list data with the additional item file 800 by itself. At S912, update for the amended package list data completes, and all additional item files 800 are downloaded. At S914, when the download of the additional item file 800 completes, the mobile communication terminal 100 transmits a transmission completion signal to the item server 112. At S916, the item server 112 transmits a response signal for the transmission completion signal to the mobile communication terminal 100.

Here, another step will be performed between S904 and S906. If there is an item purchase request at S904, the item server 112 extracts the game content main name corresponding to the additional item file 800 to purchase and transmits it to the mobile communication terminal 100. The mobile communication terminal 100 checks if there is package list data 300 corresponding to the received game content main name in the content storage 106. Since it means that basic title or extension pack of game content corresponding to the additional item file 800 to purchase is already stored in the mobile communication terminal 100 if exists, then it is reported to the item server 112 that download is available. Then, S906 through S918 are performed. But, since it means that basic title or extension pack of game content corresponding to the additional item file 800 to purchase is not stored in the mobile communication terminal 100 if not exists, then it is reported to item server 112 that download is not available, and the mobile communication terminal 100 displays the failure of item purchase.

Also, between S908 and S910, encoding the paid additional item file 800 to be used only in the mobile communication terminal 100 authorized by the item server 112 can be performed. In this case, the item server 112 transmits the additional item file 800 and authentication key simultaneously or successively at S910.

Figure 10:
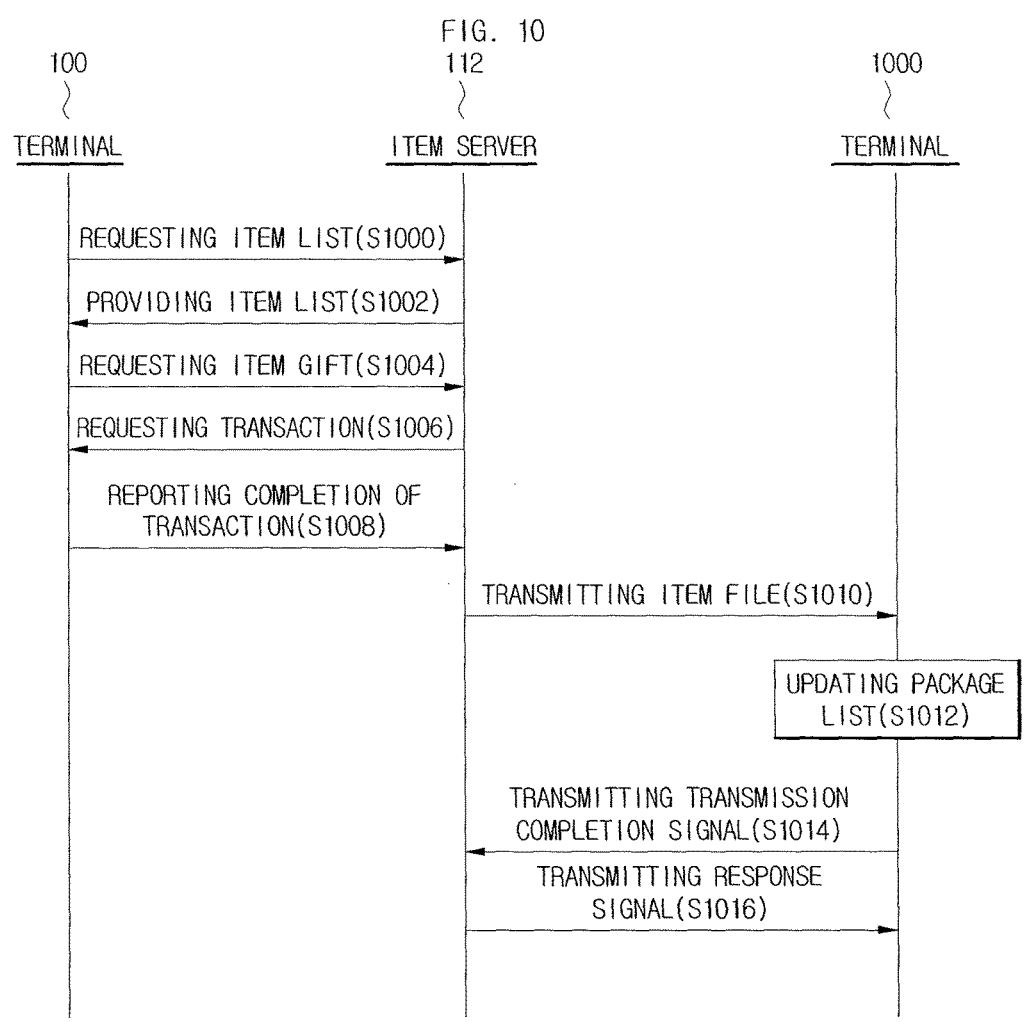
FIG. 10 is a flowchart of providing an additional item file as a gift with data usage charge to a recipient whom a buyer wants to send according to an embodiment of the present invention.

FIG. 10 is a flowchart of providing an additional item file 800 as a gift with data usage charge to a recipient according to an embodiment of the present invention.

Referring to FIG. 10, at S1000, the mobile communication terminal 100 of a gift provider who wants to give a gift requests an item list to the item server 112 via landline/wireless portal. At S1002, the item server 112 searches a list of item file from its database 114 or an external item file provider and transmits it to the mobile communication terminal 100 of the gift provider. At S1004, the mobile communication terminal 100 of the gift provider selects items to give as a gift from the received item list and requests for an item gift. At this time, identification data (e.g., phone number (CTN) or Mobile Identification Number (MIN)) of a gift recipient who will download the gifted item is transmitted to the item server 112 simultaneously or successively. In this case, the item to give as a gift may be one or more than two. At S1006, the item server 112 extracts billing data from file data of the item to give as a gift and demands transaction of a payment to the mobile communication terminal 100 of the gift provider. The request of transaction can be performed by the item server 112, or the billing server that was used in the existing mobile communication system requests transaction to the mobile communication terminal 100 of the gift provider as response to a request from the item server 112. At S908, the mobile communication terminal 100 of the gift provider pays data usage charge for the item to give as a gift by a small amount transaction, etc., and completes transaction. And, transaction completion data is transmitted to the item server 112. Here, if the transaction request is made by the billing server, the billing server can report data of transaction completion to the item server 112.

At S1010, the item server 112 transmits the additional item file 800 to the mobile communication terminal 1000 of the recipient. At this, since the additional item file 800 is extension data used only for specific game content, it should be stored in a lower directory of that game content. Thus, the item server 112 may transmit amended package list data including data of the additional item file 800. Or, the mobile communication terminal 1000 of the recipient can amend package list data with the additional item file 800 by itself. At 1012, update for the amended package list data completes, and all additional item files 800 are downloaded. At S1014, when the download of the additional item file 800 completes, the mobile communication terminal 1000 of the recipient transmits a transmission completion signal to the item server 112. At S1016, the item server 112 transmits a response signal for the transmission completion signal to the mobile communication terminal 1000 of the recipient.

Here, another step will be performed between S1008 and S1010. After there is transaction completion at S1008, the item server 112 extracts the game content main name corresponding to the additional item file 800 to give as a gift to the mobile communication terminal 900 of the recipient. The mobile communication terminal 900 of the recipient checks if there is package list data corresponding to the received game content main name in the content storage 106.

If exists, it means that basic title or extension pack of game content corresponding to the gifted additional item file 800 is already stored in the mobile communication terminal 1000 of the recipient. Thus, it is reported to the item server 112 that download is available. Then, S1010 through S1016 are performed.

But, if not exists, it means that basic title or extension pack of game content corresponding to the gifted additional item file 800 is not stored in the mobile communication terminal 1000 of the recipient. At this time, the mobile communication terminal 1000 of the recipient can download the gifted additional item file 800 after downloading the basic title or extension pack of the game content. Namely, after registering the gifted additional item file 800 to the mobile communication terminal 1000 of the recipient, the additional item file 800 can be downloaded by storing basic title or extension pack of the corresponding game content and reporting it to the item server 112.

At S1010, the following method is also possible in the download.

Gift receipt detail is reported to the mobile communication terminal 1000 of the recipient. This can be performed by SMS, E-mail or gift depository. Then, the mobile communication terminal 1000 of the recipient can download data relating to the additional item file 800 through wireless Internet access by SMS (SMS callback URL), or from the gift depository. Here, the gift depository is a program that is already stored in the mobile communication terminal 1000 of the recipient, and when receiving the additional item file 800 as a gift, displays data such as wireless Internet access address to download the additional item file 800 on screen of the mobile communication terminal 1000 of the recipient.

Also, the recipient can give the gifted additional item file 800 to anther person as gift. In this case, since it is already paid by the first gift provider, further transaction is not needed.

Also, between S1008 and S1010, encoding the paid additional item file 800 to be used only in the mobile communication terminal 100 authorized by the item server 112 can be performed. In this case, the item server 112 at S1010 transmits the additional item file 800 and authentication key at the same time or successively.

(2) Second Embodiment

Figure 11:
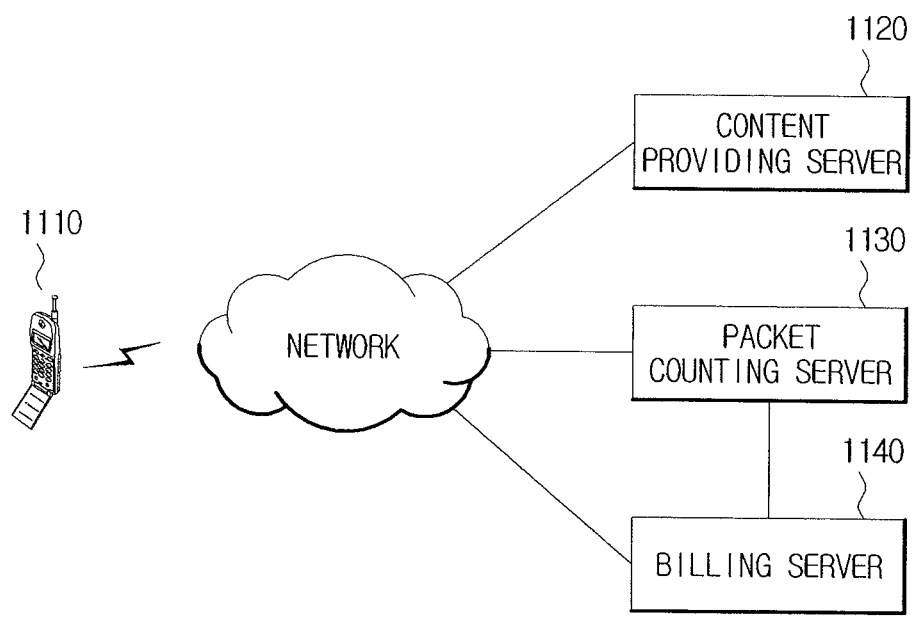
FIG. 11 is a block diagram of a conventional billing system.

FIG. 11 is block diagram of a conventional billing system.

As shown in FIG. 11, a mobile communication terminal 1110 can receive multimedia content from a content providing server 1120 via wireless data network. At this time, the data network comprises base station, packet control function (PCF), packet data serving node (PDSN) and so on.

The file that the content providing server 1120 provides to the mobile communication terminal 1110 comprises a header including IP data and billing data as well as content to be downloaded, and a packet counting server 1130 counts the number of packets that the content providing server 1120 transmits to the mobile communication terminal 1110 and reports the number of packets to a billing server 1140. And then, the billing server 1140 calculates actual charge by applying a rate per one packet and demands it to a user.

Since this packet billing is performed on IP level (layer 3) in the conventional billing server, total size of data (the number of packets) is figured out and then rate per one packet is applied to the total size.

But, according to the aforementioned method, there is a problem that an excessive packet download charge for large size content such as game is imposed to user.

Figure 12:
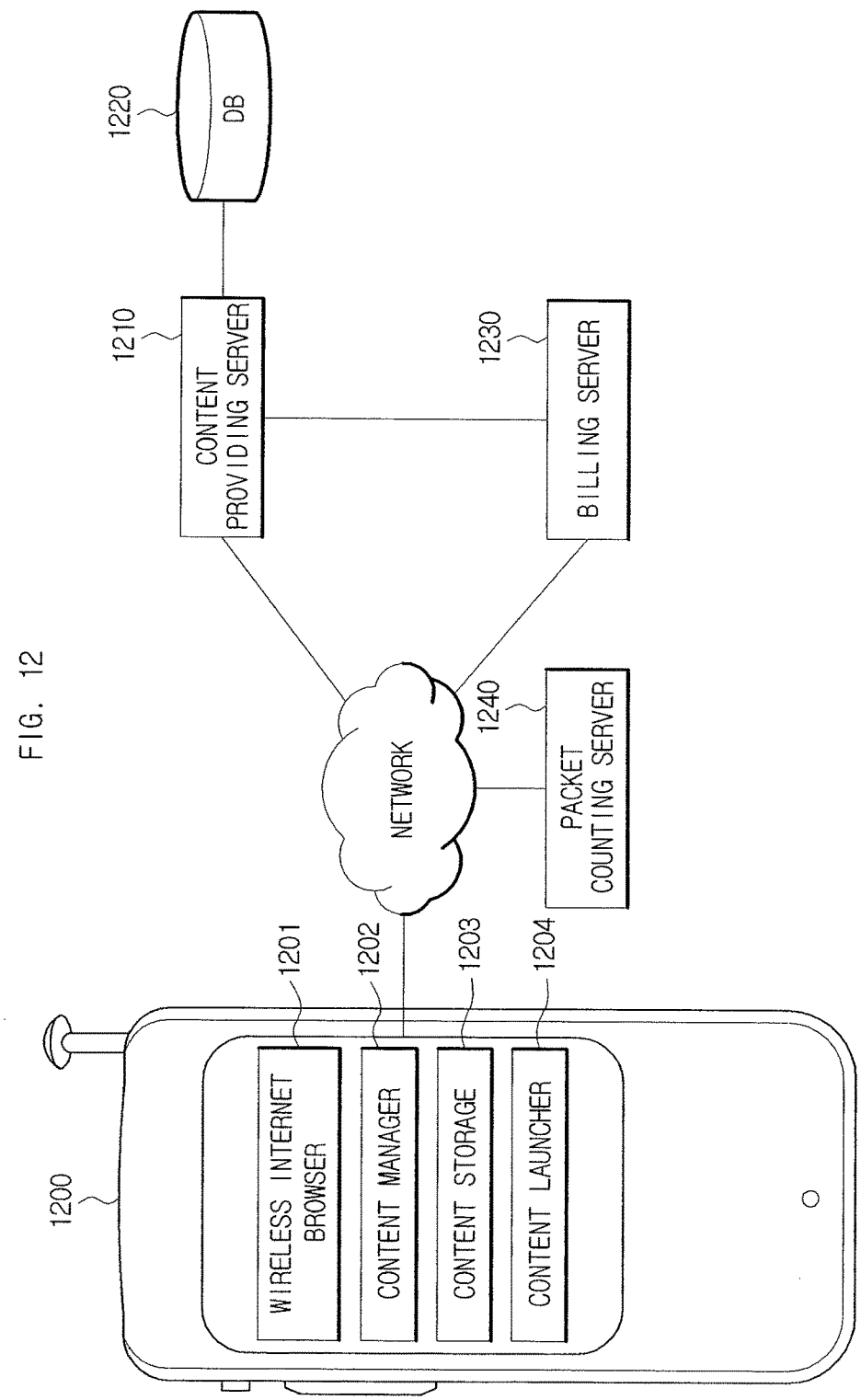
FIG. 12 is a block diagram of a fixed rate billing system for content having sub-content file structure according to another embodiment of the present invention.

FIG. 12 is a block diagram of a fixed rate billing system for content having sub-content file structure according to the present invention. As shown in FIG. 12, the system according to the present invention comprises a mobile communication terminal 1200, a content providing server 1210, a content database 1220, a billing server 1230, and a packet counting server 1240.

The mobile communication terminal 1200 comprises a wireless Internet browser 1201, a download agent 1202, a content storage 1203 and a content launcher 1204.

The wireless Internet browser 1201 such as 'KUN' provided by KTFreetel enables the mobile communication terminal 1200 to perform data communication. The mobile communication terminal 1200 can communicate data with plural servers on wireless network through the wireless Internet browser 1201.

The download agent 1202 checks the completion of transmission, need of patch, etc., when downloading content from the content providing server 1210. As download agent was already described in FIG. 5, same description will be omitted here.

The content storage 1203 stores various kinds of game content received through wireless network. The content storage 1203 may be a built-in memory of the mobile communication terminal 1200 or an external memory that can be attached. Here, the mobile communication terminal 1200 has a content management system with directory structure or folder structure enabling to receive a large number of content and manage each content.

The content launcher 1204 runs content that a user downloads.

The content providing server 1210 provides various kinds of multimedia content to the mobile communication terminal 1200 on wireless network. Content being provided by the content providing server 1210 according to the present invention is multimedia content of sub-content file structure, which consists of at least two files, and comprises game, moving picture, and so on.

Here, the sub-content file may comprise execution file (exe file), DLL file and resource file.

The content providing server 1210 may comprise content database 110 in itself or provide multimedia content that an external content provider provides to the mobile communication terminal 1200. A method that the content providing server 1210 provides multimedia content to the mobile communication terminal 1200 will be described.

In addition, the content providing server 1210 in FIG. 12 may have same configuration as shown in FIG. 2, and each module was already described, so same description will be omitted here.

Figure 13:
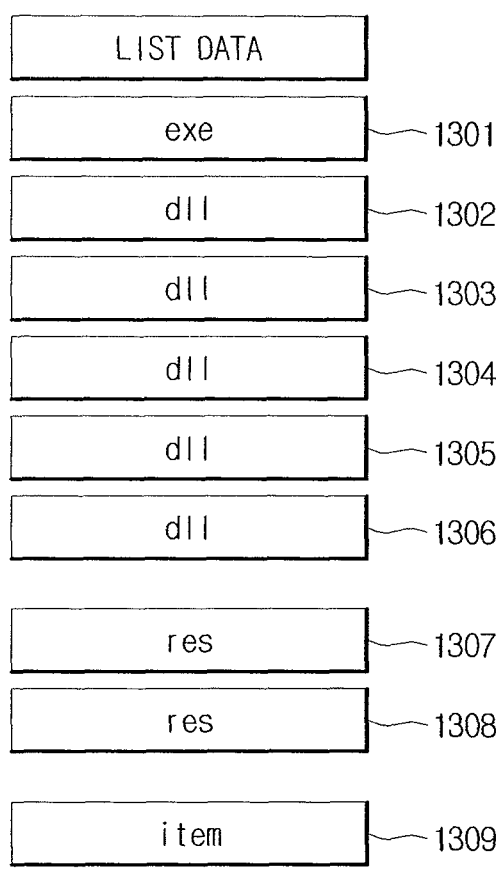
FIG. 13 shows one example of list data of a sub-content file package being generated according to another embodiment of the present invention.

FIG. 13 shows one example of list data of a sub-content file package being generated according to the present invention. Package list data in FIG. 13 is the package list of FIG. 4 in a different way. According to one embodiment of the present invention, one of plural files included in the package list comprises a billing command.

In content downloading via mobile network, it was common to charge by the amount of transmitted packet. But, when indiscriminately charged by the amount of packets, it may happen to charge senselessly for large size multimedia content, especially game content.

According to the present invention, the billing command is only included in at least one of sub-content files in order to prevent charging too much for transmission of multimedia content. The content providing server 1210 inserts data of the file including billing data in package list data, and then transmits it to the mobile communication terminal. According to one embodiment of the present invention, if there is a request from the mobile communication terminal, the content providing server 1210 transmits the latest package list data to the mobile communication terminal 1200. The mobile communication terminal 1200 receives the latest package list data and requests download of required files based on the received package list data.

For example, if downloading content for the first time, the mobile communication terminal 1200 requests download of all files included in the package list. If downloading a patch file when basic content is stored, the mobile communication terminal requests download of files having different version data of individual files among sub-content files of the basic content to the content providing server 1210.

Also, when downloading an extension pack which is not basic content, if the basic content was already stored, the mobile communication terminal requests download of sub-content files of extension pack's own, namely, at least one file that is not included in the basic content, and if basic content was not stored, then the mobile communication terminal requests download of all files comprising of the extension pack.

At this time, according to an embodiment of present invention, fixed rate billing can be performed when the first downloading of the basic content and downloading of the extension pack except patch files.

According to the present invention, the mobile communication terminal 1200 receives package list data including data of billing command, and requests download of required files. Header data in download request signal of the mobile communication terminal 1200 includes data of files including billing command. The packet counting server 1240 keeps monitoring this, and if the download is performed, counts the number of packets of sub-content files.

At this time, the packet counting server 1240 counts the amount of packets of sub-content files being downloaded. If content being downloaded is a target of fixed rate billing, the packet counting server omits the amount of packets of files including non-billing command, and converts the amount of packets of files including billing command into the predetermined amount of packets and sends it to the billing server 1230.

The billing server performs a billing process by applying a certain rate to the amount of packets transmitted from the packet counting server 1240. For content having sub-content file structure like the present invention, the packet counting server 1240 transmits converted the amount of packets for a certain file to the billing server 1230 so that the reasonable billing becomes possible.

For example, if only exe file 1301 has the billing command and the other files has non-billing command in content of which total size is 100M, the packet counting server 1230 counts not only packets of exe file 1301 but also packets of the other files 1302-1309. But, the packet counting server 1230 omits the amount of packets of the other files, and transmits the converted amount of packets (e.g., 300K) of the exe file 1301 to the billing server 1230. By this, it is possible to perform the fixed rate billing even when transmitting content comprising plural files. FIG. 14 shows one example of list data of a patch file of a sub-content file package and extension pack being generated according to the present invention.

Referring to FIG. 14, package list data of sub-content files, which the content providing server 1210 generates, comprises list data of sub-content files of basic content, list data of patch file, and list data of sub-content files of extension pack.

In an embodiment of the present invention, sub-content files of basic content consists of exe, dll1, dll2, dll3, dll4, res1, res2 and item1, and patch file consists of exe*, dll1*, dll3* and des1* (Here, * indicates file to be actually downloaded).

The extension pack, if basic content was already stored in the mobile communication terminal 1200, consists of exe*, dll1*, dll5, res2* and res3, and if basic content was not stored in the mobile communication terminal 1200, consists of exe*, dll1*, dll2, dll3, dll4, dll5, res1, res2*, res3 and item1.

Each file shares same Appl ID, but has different unified version data. In this embodiment, unified version data of the basic content is 1.00.01, unified version data of the patched content is 1.00.20, and unified version data of the extension pack is 2.00.03.

Here, 1 or 2, which is the first number, is major version data for identifying basic content and extension pack.

As described above, exe files. Dll1 to dll5, res1 and res2 among sub-content files comprising extension pack are sub-content files being shared by the basic content, and res3 and item 1 file are sub-content files of extension pack's own which are not in the basic content.

According to the present invention, when transmitting patch file or extension pack of content comprising sub-content files, it is possible to perform differential billing.

First of all, transmitting patch file will be described in detail. Patch file can be transmitted when the mobile communication terminal already stores basic content. In this case, the content providing server 1210 may receive appl. ID and version data of certain content from the mobile communication terminal 1200.

Here, the version data is not only unified version of the basic content that the mobile communication terminal 1200 stores but also unified version data of the basic content.

According to one embodiment of the present invention, the content providing server 1210 generates the latest package list data of content that the mobile communication terminal 1200 stores and transmits it to the mobile communication terminal 1200.

Since package list data according to the present invention comprises individual version data of each sub-content file, the mobile communication terminal 1200 compares version data of sub-content files of the already-stored content with version data of sub-content files in the latest package list data, and requests download of required files to the content providing server 1210.

At this time, since the latest package list data that the content providing server 1210 provides is package list data for patch file, it does not include data of files having billing command. By this, if the mobile communication terminal 1200 requests download of the required file, header data does not comprise billing command. At this time, even though the packet counting server 1240 counts the number of packets of each file, it omits the counted amount of packets and transmits it to the billing server 1230.

Thus, since the billing server 1230 does not receive packet amount data for the patch file from the packet counting server, the billing server processes transmission of patch file as charge exemption.

Next, transmitting sub-content files comprising extension pack will be described in detail.

As described above, part of sub-content files comprising extension pack are shared by that comprising basic content. These shared files are files of basic content's own, and the others are files of extension pack's own.

In providing extension pack based on this classification, billing point is designated at least one of sub-content files of the basic content's own, and also at least one of sub-content files of the extension pack's own.

Namely, at least one of sub-content files of the basic content's own comprises billing command, and also at least one of sub-content files of the extension pack's own comprises billing command.

For example, if there is a content transmission request from a user, the content providing server 1210 according to the present invention checks whether this request if for the basic content or the extension pack. If the request is for transmitting the extension pack, the latest package list of the extension pack is generated and transmitted to the mobile communication terminal 1200.

If the mobile communication terminal 1200 does not have the basic content, it requests download of all files in the extension pack package list.

In this case, the mobile communication terminal 1200 requests download files having billing command of the basic content's own and files having billing command of the extension pack's own. The packet counting server 1240 identifies billing command to count the number of packets of files having billing command of the basic content's own and perform a packet amount conversion process. Also, independently to this, the packet counting server 1240 counts the number of packets of files having billing command of the extension pack's own and performs a packet amount conversion process.

Then, each converted packet amount is transmitted to the billing server 1230, and the billing server performs billing process for the download of the extension pack by applying the predetermined rate to each converted packet amount.

But, if the mobile communication terminal 1200 already stores the basic content, the mobile communication terminal 1200 requests download of files of the extension pack's own. Even if it requests files of the basic content's own, it will be regarded as request for patch file.

Thus, the packet counting server 1240 performs a packet amount conversion process only for files having billing command of the extension pack's own. Since the billing server 1230 performs the billing process based on the converted packet amount of files of the extension pack's own, the charge for downloading the extension pack will be much cheaper than the case that the basic content is not stored.

It may be possible that there are many kinds of extension packs having different unified version. According to the present invention, it is possible to perform differential billing for extension packs having different versions based on files having billing command.

Extension packs having different unified version may also share same files, and on the other hand, each extension pack has its own file. The present invention can perform the billing process by inserting billing command to files of each extension pack's own, or by inserting billing command to files shared by each extension pack with referring to version data.

In the first method, billing command will be inserted to different files according to each unified version, and this data is generated by the content server 1210 and is included in the package list data.

Thus, if the mobile communication terminal 1200 requests download of the extension pack, the packet counting server 1240 counts the number of packets of files having billing command. At this time, the amount of packets for each file may be different, and according to this, the converted packet amounts may be different.

Like this, since the converted packet amounts, of which each is generated differently, is sent to the billing server 1230, it becomes possible to perform billing for each extension pack differently.

Additionally, in the second method, billing command will be inserted to the same file. Thus, the packet amount of files having billing command will be converted to the same value by the packet counting server 1240. But, the packet counting server 1240 converts packet amounts in a different rate with referring to the unified version, and then transmits it to the billing server 1230.

It also becomes possible to perform the billing process individually for each extension pack by the differently converted packet amounts.

Figure 15:
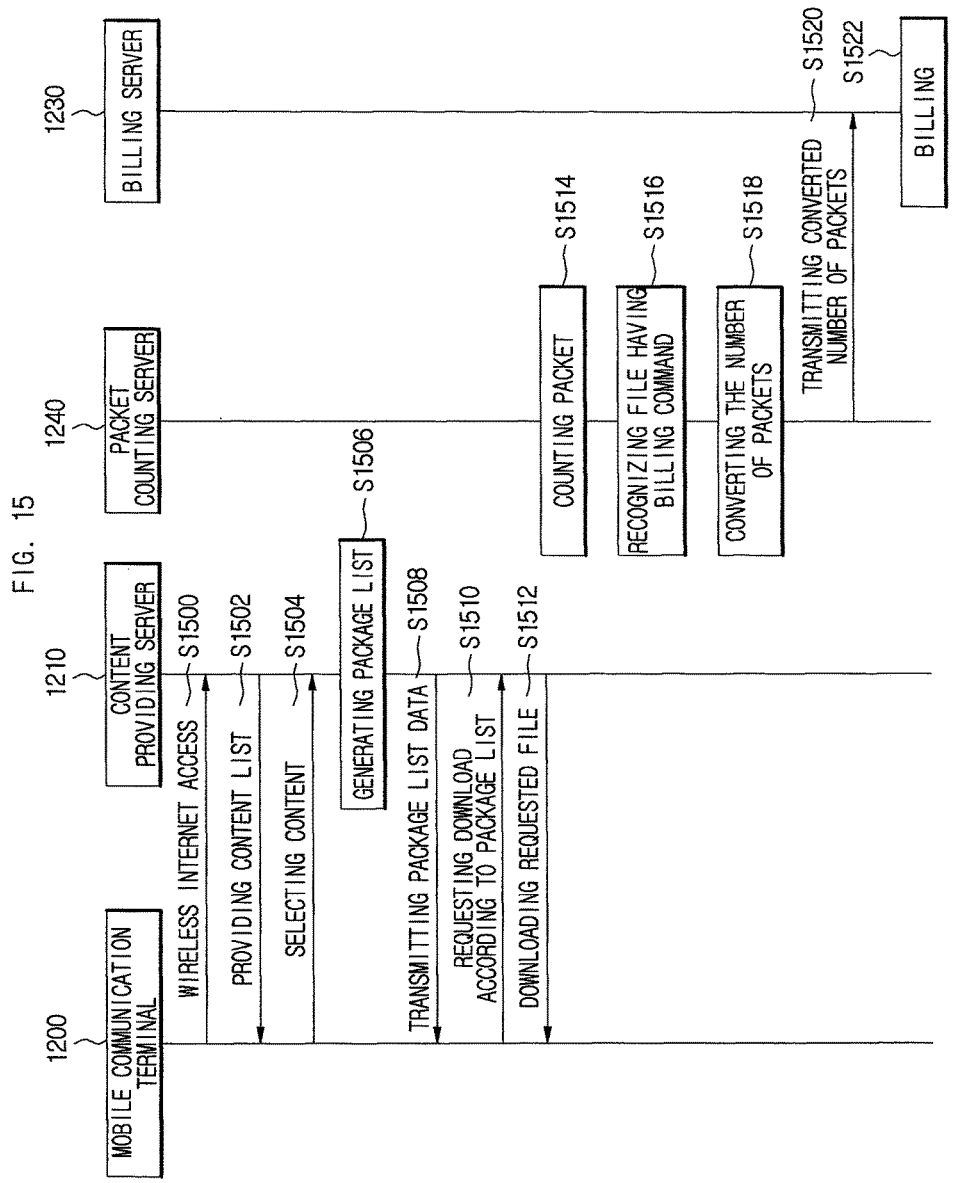
FIG. 15 is a flowchart illustrating a fixed rate billing method for basic content having sub-content file structure according to another embodiment of the present invention.

FIG. 15 is a flowchart illustrating a fixed rate billing method for basic content having sub-content file structure according to another embodiment of the present invention.

Referring to FIG. 15, when the mobile communication terminal 1200 accesses wireless Internet by the wireless Internet browser 1201 (S1500), the content providing server 1210 provides a list of content (S1502). If a user selects content and transmits it to the content providing server 1210 (S1504), the content providing server 210 generates package list data for sub-content files (S1506). Then, this is transmitted to the mobile communication terminal 1200 (S1508).

The mobile communication terminal 1200 requests download of required files by referring to the package list data to the content providing server 1210 (S1510).

Then, the content providing server 1210 transmits the required file to the mobile communication terminal (S1512).

When sub-content files are being downloaded, the packet counting server 1240 counts the number of packets to be transmitted to the mobile communication terminal 1200 (S1514).

Among this, files having billing command are identified (S1516), and the amount of packets of the file is converted in the predetermined packet amount (S1518).

In this, the converted packet amount is transmitted to the billing server 1230 (S1520), and the billing server 1230 performs billing by applying the predetermined rate to the converted packet amount (S1522).

Figure 16:
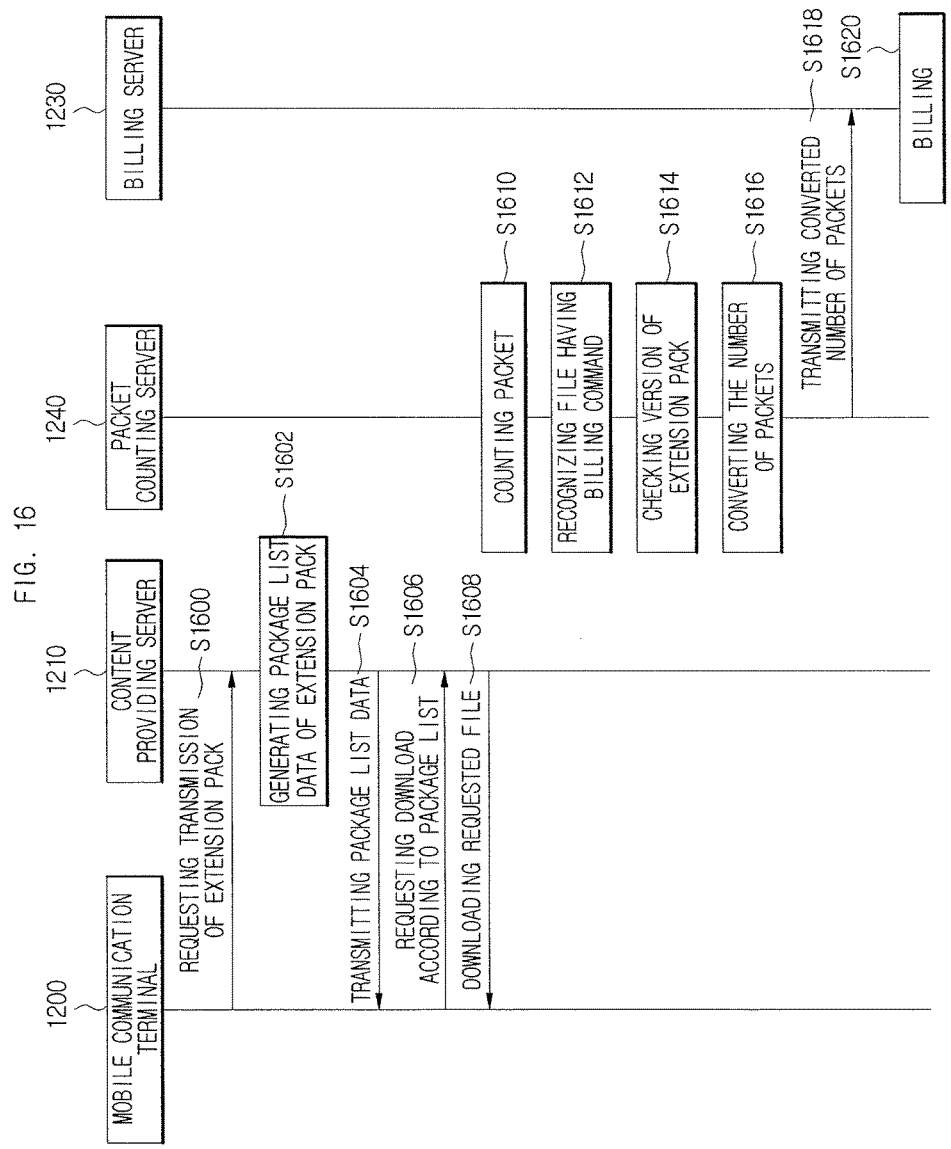
FIG. 16 is a flowchart illustrating a fixed rate billing method for extension content having sub-content file structure according to another embodiment of the present invention.

FIG. 16 is a flowchart illustrating a fixed rate billing method for extension content having sub-content file structure according to another embodiment of the present invention.

The case, that the mobile communication terminal 1200 requests for the transmission of extension packs and files having billing command of the extension pack's own are same, will be described.

Referring to FIG. 16, when the mobile communication terminal 1200 requests for the transmission of the extension pack (S1600), the content providing server 1210 generates package list data of the extension pack (S1602).

The content providing server 1210 transmits the package list data of the extension pack to the mobile communication terminal 1200 (S1604).

The mobile communication terminal 1200 requests the download of required files according to the package list to the content providing server 1210 (S1606), and the content providing server 1210 downloads the requested file to the mobile communication terminal 1200 (S1608).

Here, the required file, if the mobile communication terminal 1200 already stored basic content, may comprise files to be patched among files of the basic content's own and files of the extension pack's own, or if the basic content is not stored, may comprise all files comprising the extension pack.

When sub-content files are being downloaded, the packet counting server 1240 counts the number of packets to be transmitted to the mobile communication terminal 1200 (S1610).

Among this, files having billing command are identified (S1612).

At this time, the packet counting server 1240 identifies extension pack unified version of files that are being downloaded (S1614), and converts the counted packet amount with a different rate according to the identified unified version (S1616).

The converted packet amount is transmitted to the billing server 1230 (S1618), and the billing server 1230 performs billing by applying the predetermined rate to the converted packet amount (S1620).

Benefits of inventive embodiment may include one or more the followings. By generating list data of sub-content files to be downloaded and inserting billing data to the list data, it becomes possible to charge for each file that makes up content rather than charge entirely for the amount of packets so efficiently billing management can be performed; An effective billing method and system on patch or extension pack as well as basic content; to the method and system of providing an item file of game content, it becomes possible to provide game content and add and change only extension data which does not change an execution file simultaneously or after downloading game content only; and it is possible to charge for data usage when extension data of game content is added or changed. And, since files are managed by using directories, it is possible to download extension data that is added later in a lower directory of corresponding game content.

The aforementioned embodiments of the present invention are for describing the present invention, so those who skilled in the art will understand there will be many of alternatives, changes, and addition, and these alternatives, changes, and addition will be included within the scope of the following claims.

What is claimed is:

1. A method of providing multimedia content to a mobile communication terminal, the method comprising:
   (a) receiving a content transmission request from the mobile communication terminal, wherein the requested content comprises a plurality of sub-content files, wherein the sub-content files comprise an execution file of the requested content, a dynamic link library (DLL) file of the requested content, and a resource file of the requested content, wherein at least one of the sub-content files includes a billing command, and wherein a type of the requested content is one of a basic content, an extension pack, and a patch file;
   (b) generating a package list for the requested content, wherein the package list comprises i) a list of sub-content files to be downloaded to the mobile terminal and ii) data relating to the sub-content file having the billing command;
   (c) transmitting the package list to the mobile communication terminal;
   (d) transmitting the sub-content files comprising the requested content to the mobile communication terminal according to the package list;
   (e) counting the amount of packets of the sub-content file having the billing command, among the transmitted sub-content files;
   (f) converting the counted amount of packets to a new amount of packets by applying a predetermined conversion rate for a packet amount conversion to the counted amount of packets, wherein the predetermined conversion rate for the packet amount conversion is differently applied according to a unified version of the extension pack when the requested content is the extension pack; and
   (g) billing the transmission of the sub-content file having the billing command by applying a predetermined billing rate to the new amount of packets created through the packet amount conversion,
   wherein in a case that the requested content is the extension pack, the transmitting (d) includes:
       transmitting at least one sub-content file which is not included in the basic content if the basic content of the requested content is stored in the mobile communication terminal; and
       transmitting all sub-content files of the extension pack if the basic content of the requested content is not stored in the mobile communication terminal.

2. The method in claim 1, further comprising processing a billing exemption for the other sub-content files except the sub-content file having the billing command.

3. The method in claim 1, wherein generating (b) comprises generating the package list relating to the sub-content files having non-billing command.

4. The method in claim 1, wherein the content transmission request comprises an application identification (ID) and an unified version of content, wherein the unified version is for identifying the basic content and the extension pack, wherein if the requested content is the extension pack, then generating (b) generates the package list corresponding to the extension pack, wherein the package list corresponding to the extension pack comprises data relating to at least one first file having the billing command among the sub-content files of the basic content and data relating to at least one second file having the billing command among the sub-content files of the extension pack.

5. The method in claim 4, wherein if the mobile communication terminal does not store the basic content corresponding to the requested extension pack, billing (g) comprises billing based on the converted amount of packets of the first file and the second file.

6. The method in claim 4, wherein if the mobile communication terminal stores the basic content corresponding to the requested extension pack, billing (g) comprises billing based on the converted amount of packets of the second file.

7. The method in claim 1, wherein the content providing server provides at least one extension pack having a different unified version and the billing command is assigned to a different file according to the unified version of the extension pack.

8. The method in claim 1, wherein the content providing server provides at least one extension pack having a different unified version, and throughout the at least one extension pack, the billing command is designated to a same sub-content file.

9. The method in claim 1, wherein the sub-content files comprise item files.

10. A fixed rate billing system associated with delivery of multimedia content to mobile communication terminals, comprising:
    a content providing server being in data communication with a mobile communication terminal via a network, configured to 1) receive a transmission request of a specific content from the mobile communication terminal, wherein the requested content comprises a plurality of sub-content files, wherein the sub-content files comprises at least one of an execution file of the requested content, a dynamic link library (DLL) file of the requested content, and a resource file of the requested content, wherein at least one of the sub-content files includes a billing command, and wherein a type of the requested content is one of a basic content, an extension pack, and a patch file, 2) generate a package list for the requested content, wherein the package list comprises i) a list of sub-content files to be downloaded to the mobile communication terminal and ii) data relating to the sub-content file having the billing command, 3) transmit the package list to the mobile communication terminal, and 4) transmit the sub-content files comprising the content to the mobile communication terminal according to the package list;

a packet counting server configured to count the amount of packets of the sub-content file having the billing command and to convert the counted amount of packets to a new amount of packets by applying a predetermined conversion rate for a packet amount conversion to the counted amount of packets, wherein the predetermined conversion rate for the packet amount conversion is differently applied according to a unified version of the extension pack when the requested content is the extension pack; and a billing server configured to bill only for the transmission of the sub-content file having the billing command by applying a predetermined billing rate to the new amount of packets created through the packet amount conversion, wherein in a case that the requested content is the extension pack, the content providing server is configured to:

transmit at least one sub-content file which is not included in the basic content if the basic content of the requested content is stored in the mobile communication terminal; and transmit all sub-content files of the extension pack if the basic content of the requested content is not stored in the mobile communication terminal.

11. The system in claim 10, wherein the billing server processes a billing exemption for the other sub-content files except the sub-content file having the billing command.

12. The system in claim 10, wherein if the transmission request of the content is a transmission request for the patch file, the content providing server generates the package list relating to the sub-content files having non-billing command.

13. The system in claim 10, wherein the content transmission request comprises an application ID and an unified version of the content, wherein the unified version comprises a major data for identifying between the basic content and the extension pack, wherein if the requested content is the extension pack, then the content providing server generates the package list corresponding to the extension pack, wherein the package list corresponding to the extension pack comprises data relating to at least one first file having billing command among the sub-content files of basic content and data relating to at least one second file having billing command among the sub-content files of extension pack.

14. The method in claim 1, wherein at least one of the sub-content files does not include a billing command.

15. The system in claim 10, wherein at least one of the sub-content files does not include a billing command.

16. A method of providing multimedia content to a mobile communication terminal, the method comprising:
(a) receiving a content transmission request from the mobile communication terminal, wherein the requested content comprises a plurality of sub-content files, wherein the sub-content files comprise an execution file of the requested content, a dynamic link library (DLL) file of the requested content, and a resource file of the requested content, wherein at least one of the sub-content files includes, and wherein a type of the requested content is one of a basic content, an extension pack, and a patch file;
(b) generating a package list for the requested content, wherein the package list comprises i) a list of sub-content files to be downloaded to the mobile terminal and ii) data relating to the sub-content file;
(c) transmitting the package list to the mobile communication terminal;
(d) transmitting the sub-content files comprising the requested content to the mobile communication terminal according to the package list;
(e) counting the amount of packets of the sub-content file;
(f) converting the counted amount of packets to a new amount of packets by applying a predetermined conversion rate for a packet amount conversion to the counted amount of packets, wherein the predetermined conversion rate for the packet amount conversion is differently applied according to a unified version of the extension pack when the requested content is the extension pack; and
(g) billing the transmission of the sub-content file by applying a predetermined billing rate to the new amount of packets created through the packet amount conversion, wherein in a case that the requested content is the extension pack, the transmitting (d) includes:

transmitting at least one sub-content file which is not included in the basic content if the basic content of the requested content is stored in the mobile communication terminal; and transmitting all sub-content files of the extension pack if the basic content of the requested content is not stored in the mobile communication terminal.

\* \* \* \* \*